US009785102B2

(12) United States Patent
Omata et al.

(10) Patent No.: US 9,785,102 B2
(45) Date of Patent: Oct. 10, 2017

(54) ROTATABLE FIXING MEMBER, MANUFACTURING METHOD THEREOF AND FIXING DEVICE

(71) Applicant: CANON KABUSHIKI KAISHA, Tokyo (JP)

(72) Inventors: Masahito Omata, Yokohama (JP); Shoji Umehara, Moriya (JP); Shuichi Tetsuno, Numazu (JP); Akeshi Asaka, Kashiwa (JP); Masayuki Onuma, Toride (JP); Yusuke Baba, Yokohama (JP); Kazuo Kishino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 566 days.

(21) Appl. No.: 14/144,742

(22) Filed: Dec. 31, 2013

(65) Prior Publication Data

US 2014/0112692 A1 Apr. 24, 2014

Related U.S. Application Data

(62) Division of application No. 12/896,473, filed on Oct. 1, 2010, now abandoned.

(30) Foreign Application Priority Data

Oct. 5, 2009 (JP) ................................ 2009-231312

(51) Int. Cl.
*B32B 9/04* (2006.01)
*G03G 15/20* (2006.01)

(52) U.S. Cl.
CPC ....... *G03G 15/2089* (2013.01); *G03G 15/206* (2013.01); *G03G 15/2053* (2013.01); *G03G 2215/2035* (2013.01); *G03G 2215/2048* (2013.01)

(58) Field of Classification Search
CPC .............. C03G 15/205; C03G 15/2053; C03G 15/2057; C08J 7/04; G03G 15/1695; G03G 15/2042; G03G 15/2053; G03G 5/14726
USPC ........... 399/328, 329, 331, 333, 45, 69, 122; 427/379; 430/104; 525/276; 428/411.1
See application file for complete search history.

(56) References Cited

U.S. PATENT DOCUMENTS

| | | | |
|---|---|---|---|
| 5,780,552 | A | 7/1998 | Kerbow |
| 5,969,067 | A | 10/1999 | Brothers et al. |
| 6,177,196 | B1 | 1/2001 | Brothers et al. |
| 7,203,438 | B2 | 4/2007 | Omata et al. |
| 7,215,916 | B2 | 5/2007 | Kishino et al. |
| 7,558,519 | B2 | 7/2009 | Jinzai et al. |
| 7,725,068 | B2 | 5/2010 | Matsunaka et al. |
| 8,401,450 | B2 | 3/2013 | Sekihara et al. |

(Continued)

FOREIGN PATENT DOCUMENTS

| | | |
|---|---|---|
| JP | 10-130395 | 5/1998 |
| JP | 2000-330405 A | 11/2000 |

(Continued)

*Primary Examiner* — Khanh Tuan Nguyen
(74) *Attorney, Agent, or Firm* — Fitzpatrick, Cella, Harper & Scinto

(57) ABSTRACT

A rotatable fixing member includes an elastic layer, a primer layer provided on the elastic layer, and a parting layer provided on the primer layer. The primer layer contains a crystalline fluorocarbon polymer having a functional group and has a thickness of 850 nm or less. The parting layer is a coating layer of a crystalline fluorocarbon polymer.

13 Claims, 8 Drawing Sheets

(56) References Cited

U.S. PATENT DOCUMENTS

| | | | | |
|---|---|---|---|---|
| 2004/0007569 | A1 | 1/2004 | Ohta | |
| 2006/0251451 | A1 | 11/2006 | Ishigam et al. | |
| 2008/0063444 | A1* | 3/2008 | Kondoh | G03G 15/2057 399/329 |
| 2008/0112736 | A1 | 5/2008 | Kimura | |
| 2008/0187852 | A1* | 8/2008 | Kitano | C08J 7/04 430/104 |
| 2008/0199233 | A1* | 8/2008 | Matsunaka | G03G 15/2057 399/336 |
| 2009/0003902 | A1 | 1/2009 | Sakakibara et al. | |
| 2009/0035035 | A1* | 2/2009 | Funabiki | G03G 15/206 399/329 |
| 2009/0116886 | A1 | 5/2009 | Sakai et al. | |
| 2009/0220288 | A1 | 9/2009 | Omata | |
| 2011/0091252 | A1 | 4/2011 | Sekihara et al. | |

FOREIGN PATENT DOCUMENTS

| | | | | | |
|---|---|---|---|---|---|
| JP | 2002-514181 | A | | 5/2002 | |
| JP | 2003-140491 | A | | 5/2003 | |
| JP | 2005-062413 | | * | 3/2005 | G03G 15/20 |
| JP | 2005-212318 | | * | 8/2005 | B32B 27/30 |
| JP | 2005-212318 | A | | 8/2005 | |
| JP | 2006-163315 | A | | 6/2006 | |

* cited by examiner

ROTATABLE FIXING MEMBER, MANUFACTURING METHOD THEREOF AND FIXING DEVICE

This is a divisional of U.S. patent application Ser. No. 12/896,473, filed Oct. 1, 2010.

FIELD OF THE INVENTION AND RELATED ART

The present invention relates to a rotatable fixing member for use in an image forming apparatus such as a copying machine or a printer, a manufacturing method of the rotatable fixing member, and a fixing device. Here, the fixing device heats a recording material carrying thereon an image under the application of heat and pressure. As such a fixing device, it is possible to use a fixing device for fixing or temporarily fixing an unfixed toner image on the recording material by heating the unfixed toner image, a glossiness (gloss) increasing device for increasing the glossiness of the image by heating the image fixed on the recording material, a device for drying the recording material, on which the image has been formed by an ink jet method, by heating the recording material, and the like. Further, the rotatable fixing member includes, on a heat-resistant base material, at least an elastic layer, a primer layer of a fluorocarbon polymer (fluorine-containing resin) and a coating parting layer of a fluorocarbon polymer and can be used as a fixing roller, a fixing film, a pressing roller, a conveying roller, and the like. For the fixing device in the image forming apparatus such as an electrophotographic copying machine or an electrophotographic laser beam printer, as a method of fixing the unfixed toner image on the recording material under the application of heat and pressure, a method using the fixing roller or a method using the fixing film is employed. In the fixing-roller method, a nip is created by press-contact of a roller (fixing roller) including a heat source as a rotatable heating member with a rotatable pressing member (pressing roller) disposed and paired with the fixing roller. Toner is melted and pressed by passing the recording material, such as paper on which the unfixed toner image is carried, through the nip, thus obtaining a fixed image. On the other hand, in the fixing-film method, a fixing unit as the rotatably heating member in which the heat source is covered with a heat-resistant film (fixing film), and the rotatable pressing member (pressing roller) disposed and paired with the fixing unit create the nip. Through the nip, the recording material carrying thereon the unfixed toner image passes, so that the toner is melted and pressed to obtain the fixed image. The pressing roller used in the fixing devices of these types requires the elastic layer in order to create a proper nip by the press contact and also requires heat resistance so as to withstand use at a toner-fixing temperature of 200° C. to 250° C. Further, in order to prevent the toner to depositing on a roller surface, a parting layer is required to be formed at an outermost surface. Further, also with respect to the fixing roller or the fixing film used in the fixing devices of these types, the parting layer is required to be formed at the outermost surface of the fixing roller or the fixing film, since the fixing roller or the fixing film directly contacts the toner image. Particularly, with respect to the fixing roller or the fixing film for the fixing device for fixing a color image, in order to ensure the glossiness (gloss) of the fixed image, there is a need to provide under the parting layer, the elastic layer for uniformizing a contact surface with the toner image. Further, both of the parting layer and the elastic layer require a heat resistance such that the layers can withstand use at about 200° C. to about 250° C.

As a conventional parting layer, those formed by coating the elastic layer with a fluorocarbon polymer (fluorine-containing resin) tube, a dispersion paint of a fluorocarbon rubber such as a fluorocarbon rubber latex, and a dispersion paint of a fluorocarbon polymer such as polytetrafluoroethylene (PTFE) or tetrafluoroethylene-perfluoroalkylvinyl ether copolymer (PFA) have been used. Further, for the purpose of ensuring good parting property with respect to the toner, good flatness at the outermost surface is desired. In addition, for the purpose of improving the fixability of the fixing roller or the fixing film and for the purpose of reducing the cost of the predetermined, a layer of the fluorocarbon polymer is desired to be made thin.

The conventional manufacturing method of the parting layer on the elastic layer is roughly classified into two methods. That is, there are a coating method and a method in which the elastic layer is coated with a tube of the fluorocarbon polymer. As the coating method in which the parting layer is smoothed and formed in a thin layer, a method as described in Japanese Laid-Open Patent Application (JP-A) 2000-330405, in which a solvent-soluble non-crystalline fluorocarbon polymer primer layer containing a cyclic fluorocarbon polymer and a parting layer of a non-crystalline fluorocarbon polymer are used, may be used. By using this method, it is possible to form the primer layer and the parting layer in a thickness of 25 μm or less, in total. However, the non-crystalline fluorocarbon polymer is liable to be softened, so that a sufficient heat resistivity and durability cannot be obtained.

Further, as a generally known coating method, a method as described in JP-A 2003-140491 or JP-A 2006-163315, in which a dispersion paint of a crystalline fluorocarbon polymer primer is used may be employed. However, in the case where this method is employed, the state of the primer layer is liable to disturb the smoothness of the surface of the fluorocarbon polymer, so that it is very difficult to obtain sufficient smoothness. In order to obtain the sufficient smoothness, it is required that baking of the parting layer is performed at high temperature for a long time and leveling of the fluorocarbon polymer parting layer is sufficiently effected, so that the parting layer causes a deterioration of the elastic layer which is an underlying layer of the parting layer.

It has been conventionally very difficult to form on the elastic layer the fluorocarbon polymer parting layer, which is thin and smooth and has sufficient durability, without causing a deterioration of the elastic layer. Further, in the method using the fluorocarbon polymer tube, from the viewpoint of handling during manufacturing, the fluorocarbon polymer tube requires strength. For that reason, the tube requires a thickness of about 200 μm and a primer layer formed between the tube and the elastic layer requires a thickness of about 5 μm, so that a layer having a thickness of about 25 μm in total is formed. It is difficult in manufacturing to further decrease the tube thickness. In addition, the fluorocarbon polymer tube is harder than the fluorocarbon polymer coating layer having the same thickness, thus being less liable to follow the recording material and an uneven toner surface. Further, the tube is generally formed by extrusion (molding) but a molecular chain of the fluorocarbon polymer constituting the tube is subjected to a shearing force to be oriented in an extrusion direction during the extrusion, so that the heat conductivity of the tube with respect to a thickness direction perpendicular to the orientation direction is lowered. For this reason, the constitution of the method using the fluorocarbon polymer tube is not advantageous in terms of fixability. Thus, it was very difficult to form the fluorocarbon polymer parting layer, which was thin and smooth and had sufficient durability, on the elastic layer, without causing a deterioration of the elastic layer.

SUMMARY OF THE INVENTION

The present invention has been accomplished in view of the above-described technical problem.

A principal object of the present invention is to provide a rotatable fixing member, prepared by successively laminating at least an elastic layer, a primer layer and a parting layer on a base material (substrate), capable of compatibly realizing a decrease in thickness of the parting layer and surface smoothness of the parting layer while suppressing thermal degradation of the elastic layer.

Another object of the present invention is to provide a manufacturing method of the rotatable fixing member and to provide a fixing device including the rotatable fixing member.

According to an aspect of the present invention, there is provided a rotatable fixing member comprising:

an elastic layer;

a primer layer provided on the elastic layer; and a parting layer provided on the primer layer, wherein the primer layer contains a crystalline fluorocarbon polymer having a functional group and has a thickness of 850 nm or less, and wherein the parting layer is a coating layer of a crystalline fluorocarbon polymer.

According to another aspect of the present invention, there is provided a fixing device comprising:

a rotatable fixing member including an elastic layer, a primer layer provided on the elastic layer, and a parting layer provided on the primer layer; and a back-up member for creating a fixing nip together with the rotatable fixing member, wherein the primer layer contains a crystalline fluorocarbon polymer having a functional group and has a thickness of 850 nm or less, and wherein the parting layer is a coating layer of a crystalline fluorocarbon polymer.

According to a further aspect of the present invention, there is provided a manufacturing method of a rotatable fixing member including an elastic layer, a primer layer and a parting layer, the manufacturing method comprising:

a first step of applying a dispersion containing a crystalline fluorocarbon polymer having a functional group onto a surface of an elastic layer;

a second step of forming a primer layer by drying the dispersion;

a third step of decreasing a thickness of the primer layer to 850 nm or less by removing a part of the primer layer on a surface side of the parting layer; and a fourth step of forming a parting layer by coating a crystalline fluorocarbon polymer onto the surface of the primer layer decreased in thickness and then by baking the coated crystalline fluorocarbon polymer.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiment 1

(1) Image Forming Apparatus

Figure 1A:
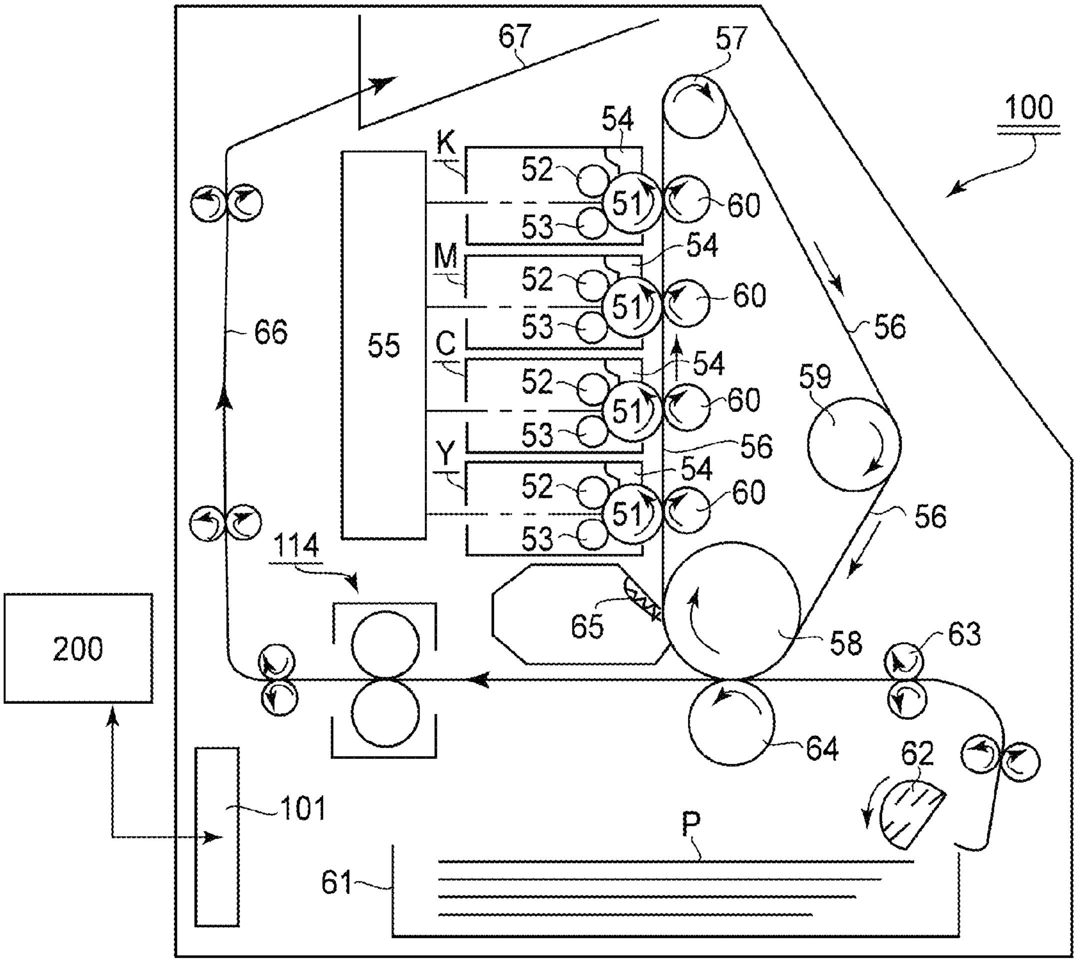
FIG. 1A is a schematic structural view of an example of an image forming apparatus.

FIG. 1A is a schematic structural view showing an example of an image forming apparatus 100 in which a fixing device 114, according to the present invention, is mounted as a fixing device for fixing an unfixed toner image on a recording material by heating the unfixed toner image. This image forming apparatus 100 is a color printer of an electrophotographic type. The image forming apparatus 100 effects color image formation on a sheet-like recording material P as a recording medium on the basis of an electrical image signal input from an external host device 200, such as a personal computer or an image reader, into a control circuit portion (control portion) 101 of the image forming apparatus 100. The control circuit portion 101 includes a CPU (computing portion) and an ROM (storing means) and transfers various pieces of electrical information between itself and the host device 200 or an operating portion (not shown) of the image forming apparatus 100. Further, the control circuit portion 101 effect centralized control of an image-forming operation of the image forming apparatus 100 in accordance with a predetermined control program or a predetermined reference table.

Four image forming portions Y, C, M and K for forming color toner images of yellow (Y), cyan (C), magenta (M) and black (K), respectively, are successively disposed from a lower portion to an upper portion, in this order, in the image forming apparatus 100. Each of the image forming portions Y, C, M and K includes an electrophotographic photosensitive drum 51 as an image bearing member, and a charging device 52, a developing device 53, a cleaning device 54, and the like which are process means acting on the drum 51. A yellow toner as a developer is accommodated in the developing device 53 of the image forming portion Y. A cyan toner as the developer is accommodated in the developing device of the cyan image forming portion C. A magenta toner as the developer is accommodated in the developing device of the magenta image forming portion M. A black toner as the developer is accommodated in the developing device of the black image forming portion K. An optical system 55 for forming an electrostatic image by exposing the drum 51 to light is provided correspondingly to the four color image forming portions Y, C, M and K. As the optical system 55, a laser-scanning exposure optical system is used. In each of the image forming portions Y, C, M and K, the drum 51, which has been uniformly charged by the charging device 52, is subjected to scanning exposure on the basis of image data from the optical system 55. As a result, an electrostatic latent image corresponding to a scanning-exposure image pattern is formed on the drum surface. The electrostatic latent image is developed into a toner image by the developing device 53. That is, on the drum 51 of the yellow image forming portion Y, a yellow toner image, corresponding to a yellow component image of a full-color image, is formed. On the drum 51 of the cyan image forming portion C, a cyan toner image, corresponding to a cyan component image of the full-color image, is formed. On the drum 51 of the magenta image forming portion M, a magenta toner image, corresponding to a magenta component image of the full-color image, is formed. On the drum 51 of the black image forming portion K, a black toner image, corresponding to a black component image of the full-color image, is formed.

The color images formed on the drums 51 of the image forming portions Y, C, M and K are successively superposed and primary-transferred, in a predetermined aligned state, onto an intermediary transfer member 56, which is rotated at the substantially same speed as that of the drums 51 in synchronism with rotations of the drums 51. As a result, an unfixed full-color toner image is synthetically formed on the intermediary transfer member 56. In this embodiment, as the intermediary transfer member 56, an endless intermediary transfer belt is used and is wound around and stretched by three rollers of a driving roller 57, a secondary-transfer opposite roller 58 and a tension roller 59, and is driven by the driving roller 57. As a primary transfer means for primary-transferring the toner image from each of the drums 51 of the image forming portions Y, C, M and K, a primary transfer roller 60 is used. To the roller 60, a primary-transfer bias of an opposite polarity to a charge polarity of the toner is applied from an unshown bias voltage source. As a result, the toner image is primary-transferred from each of the drums 51 of the image forming portions Y, C, M and K onto the belt 56.

After the primary transfer of the toner image from each of the drum 51 of the image forming portions Y, C, M and K onto the belt 56, toner remaining on each of the drums 51 as residual toner is removed by the cleaning device 54. The steps described above are performed in synchronism with the rotation of the belt 56 with respect to each of the yellow, the cyan, the magenta and the black toner, so that the primary-transfer toner images of the respective colors are successively formed superposedly on the belt 56. Incidentally, during image formation of only a single color (single-color mode), the above-described steps are performed with respect to only an objective color. On the other hand, the recording material P in a recording material cassette 61 is separated and fed one by one by a feeding roller 62 with predetermined timing. Then, the recording material P is conveyed to a transfer nip, which is a press-contact portion between a secondary-transfer roller 64 and an intermediary-transfer belt portion wound about the secondary-transfer opposite roller 58, by registration rollers 63 with predetermined timing.

The synthetic, primary-transfer toner images formed on the belt 56 are collectively transferred onto the recording material P by a bias, of an opposite polarity to the toner charge polarity, applied from an unshown bias-voltage source. Secondary-transfer residual toner remaining on the belt 56 after the secondary transfer is removed by an intermediary-transfer-belt cleaning device 65. The unfixed toner image secondary-transferred onto the recording material P is melt-mixed and fixed on the recording material P by a fixing device 114, and is sent to a sheet-discharge tray 67 through a sheet discharging path 66 as a full-color print.

(2) Fixing Device 114

Figure 1B:
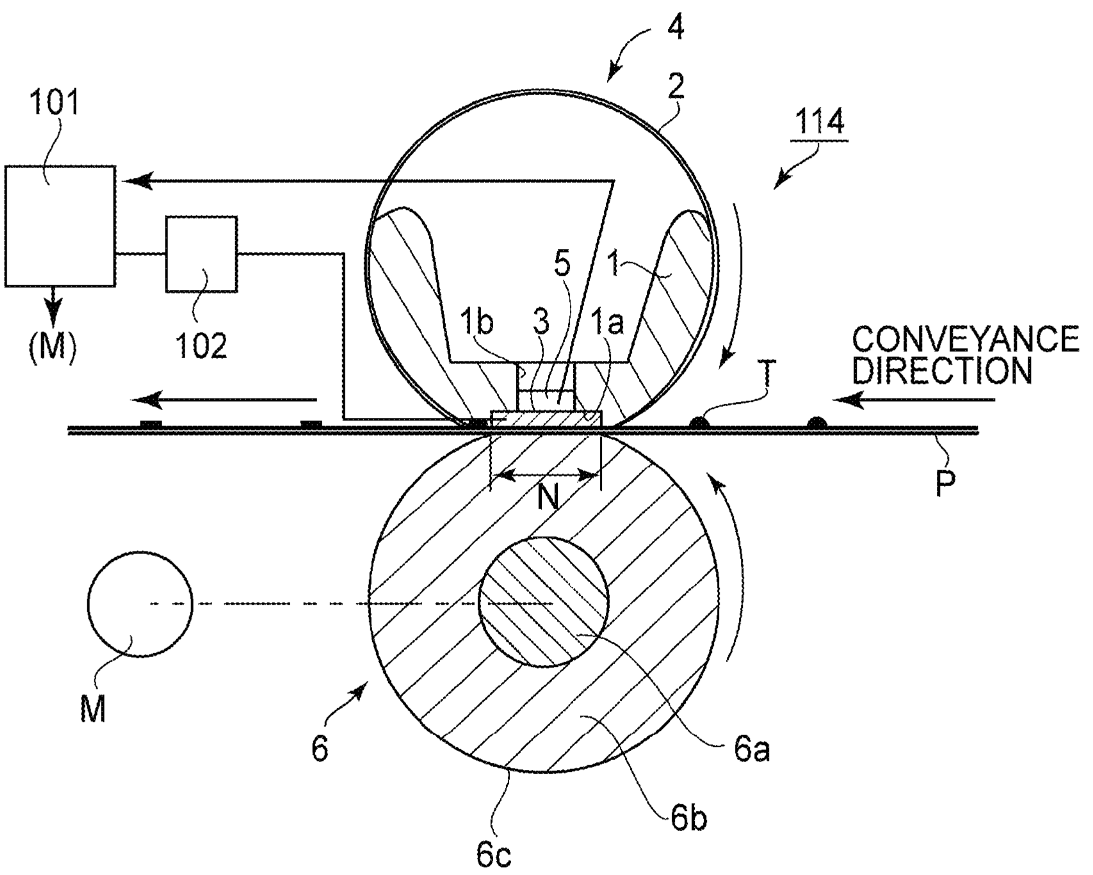
FIG. 1B is a schematic cross-sectional view of a fixing device in Embodiment 1.

FIG. 1B is a schematic cross-sectional view of a principal part of the fixing device 114 in this embodiment (Embodiment 1). Here, with respect to the fixing device and members constituting the fixing device, a longitudinal direction is a direction perpendicular to a recording-material conveyance direction in a plane of the recording material. A widthwise direction is a direction parallel to the recording-material conveyance direction in the plane of the recording material. A width is a dimension with respect to the widthwise direction. A length is a dimension with respect to the longitudinal direction. The fixing device 114 in this embodiment is basically of the film-heating type, which is a so-called known tension-less type. The fixing device 114 of this film-heating type uses a heat-resistant fixing film 2, which has flexibility and has an endless belt shape or a cylindrical shape, as the rotatable fixing member. At least a part of a circumferential portion of the fixing film 2 is always in a tension-free state (in which no tension is applied), and the fixing film 2 is rotationally driven by a rotation driving force of the rotatable pressing member (pressing member) 6.

The fixing film 2 is, as described later, prepared by successively laminating at least the elastic layer, the primer layer and the parting layer on the base material. The primer layer contains a crystalline fluorocarbon polymer having a functional group and has a thickness of 850 nm or less. The parting layer is a coating layer of a crystalline fluorocarbon polymer. The fixing film 2 is a film including the parting layer which is an outermost surface layer and is formed in a small thickness and smoothed, and enables improvement in fixability of the fixing device 114 and output of a high-gloss image.

Inside the film 2, a stay 1 as a heating-member supporting member and a film-guide member is provided. The stay 1 is a rigid member of a heat-resistant resin material that is elongated in the longitudinal direction (perpendicular to the drawing) and has a substantially semicircular trough cross section. In this embodiment, as a material for the stay 1, a heat-resistant liquid crystal polymer is used. In the neighborhood of a longitudinal central portion of the stay 1, a hole 1*b*, in which a thermistor (temperature-detecting element) 5 to be disposed to contact a heater 3 is accommodated, is provided in communication with a groove portion 1*a*. The heater 3 is a so-called ceramic heater in this embodiment and is engaged in and fixedly supported by the groove portion 1*a* provided at a widthwise central portion on a lower surface of the stay 1 along the longitudinal direction of the stay 1.

The heat-resistant cylindrical fixing film 2, as the rotatable fixing member, which has flexibility and is excellent in heat resistivity, is loosely engaged externally on an outer circumferential surface of the stay 1, which supports the heater 3, with a circumferential margin. Further, onto an inner circumferential surface of the film 2, grease is applied in order to improve its slidability with respect to the heater 3. The stay 1, the heater 3, the film 2 and the like constitute a heating assembly 4. An elastic-pressing roller (rotatable pressing member) 6 as a back-up member in this embodiment is prepared by coating a silicone foam member as a heat-resistant elastic layer 6*b* on a cylindrical shaft metal core 6*a* of iron, stainless steel, aluminum, or the like and then by coating a fluorocarbon polymer tube as a parting layer 6*c* on the elastic layer 6*b*. The roller 6 opposes the heater 3 held by the stay 1 through the film 2. Further, a predetermined pressure is exerted between the stay 1 and the roller 6 by a pressing mechanism (not shown). By this pressure, the elastic layer 6*b* of the roller 6 is elastically deformed with respect to the longitudinal direction along the heater 3 through the film 2. As a result, a nip (fixing nip) N having a predetermined width necessary to heat-fix an unfixed toner image T carried by the recording material P is created between the roller 6 and the film 2 pressed against the heater 3.

The roller 6 is rotationally driven in a counterclockwise direction indicated by an arrow at a predetermined speed by a motor (driving means) M controlled by the control circuit portion 101 at least during execution of the image formation. By a frictional force created in the nip N between the roller 6 and the film 2 by the rotation of the roller 6, a rotational force acts on the film 2. As a result, the film 2 is rotated around the stay 1 in a clockwise direction indicated by an arrow at a peripheral speed substantially corresponding to the rotational peripheral speed of the roller 6 while intimately sliding on the surface of the heater 3 in the nip N at the inner surface of the film 2. That is, the film 2 is rotated at the peripheral speed substantially equal to the conveyance speed of the recording material P, carrying thereon the unfixed toner image T, which is conveyed from an image transfer portion side. Further, the heater 3 is increased in temperature by being supplied with electric power from a power supply 102. The temperature of the heater 3 is detected by the thermistor 5. Detected temperature information is fed back to the control circuit portion 101. The control circuit portion 101 controls the electric power input from the power supply 102 to the heater 3 so that a detected temperature input from the thermistor 5 is kept at a predetermined target temperature (fixing temperature).

In a state in which the heater 3 is heated and temperature-controlled at the predetermined fixing temperature and the roller 6 is rotationally driven, the recording material P carrying thereon the unfixed toner image T is introduced into the nip N with a toner-image carrying surface oriented toward the film 2 side. The recording material P intimately contacts the outer surface of the film 2 in the nip N and is nip-conveyed in the nip N together with the film 2. As a result, heat of the heater 3 is applied to the recording material P through the film 2 and the pressing force is applied to the recording material P in the nip N, so that the unfixed toner image T is thermally press-fixed on the surface of the recording material P. The recording material P, which has passed through the nip N, is self-separated from the outer circumferential surface of the film 2 and is conveyed to the outside of the fixing device 114.

(3) Fixing Film 2

Figure 2:
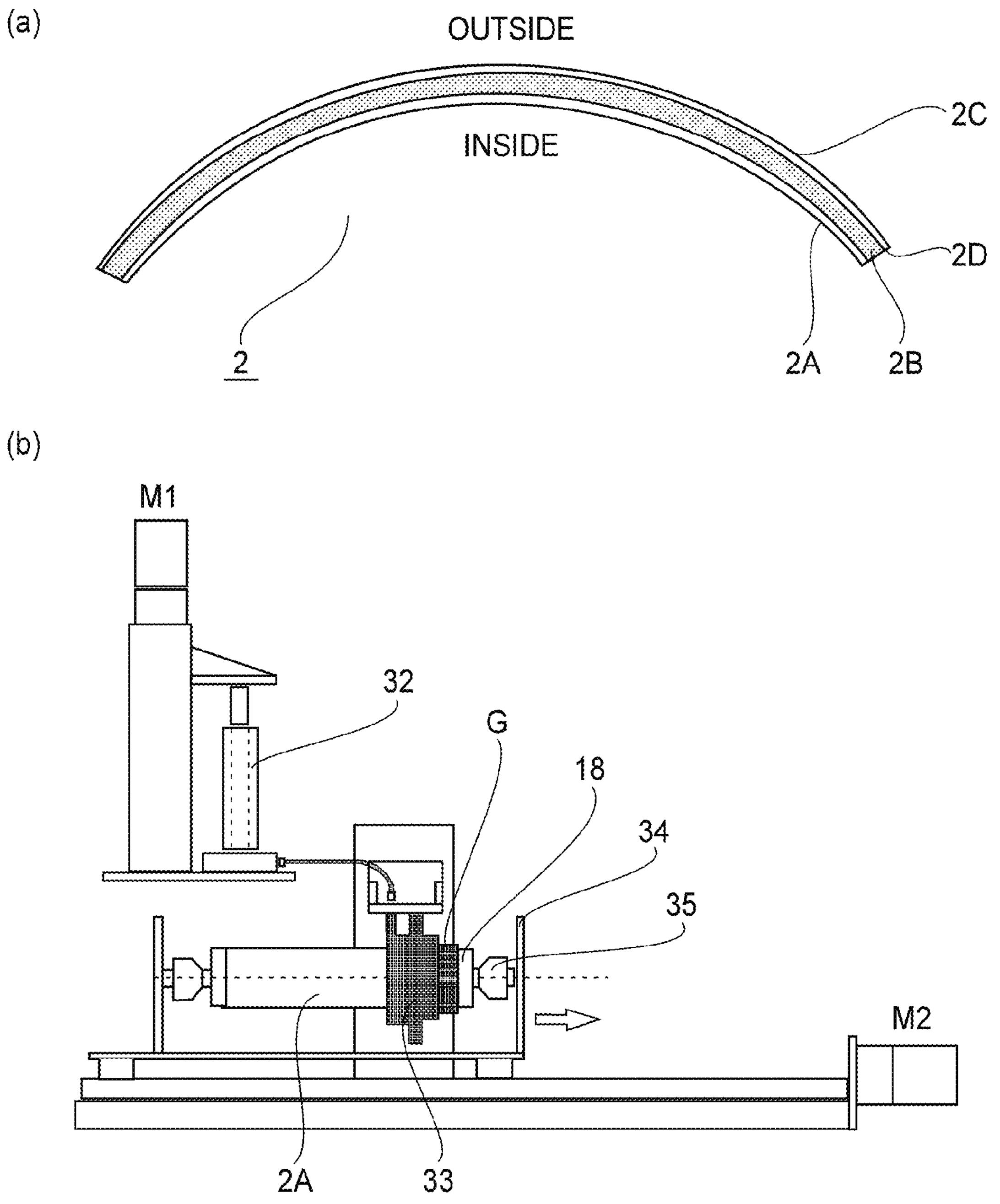
FIG. 2(*a*) is a schematic sectional view showing a layer structure of a fixing film which is a rotatable fixing member, and FIG. 2(*b*) is a schematic view of a rising coating machine.

FIG. 2(*a*) is a schematic sectional view showing a layer structure of the fixing film 2 which is the rotatable fixing member in the fixing device 114 described above. The fixing film 2 includes a base material 2A, which is a cylindrical metal member or an endless belt member of a heat-resistant resin material. The film 2 may preferably have a small total thickness in order to improve a quick start property thereof by decreasing its thermal capacity, and therefore, a smaller thickness of the base material 2A is more advantageous in terms of the quick starting of the fixing device 114. However, when the thickness of the base material 2A is excessively small, the thickness of the base material 2A may preferably be 20-100 μm. On the outer circumferential surface of the base material 2A, an elastic layer 2B is formed. The elastic layer 2B has the function of transferring the heat from the heater 3 to the recording material P or the toner T so as to cover the base material 2A while following unevenness of the recording material P or the toner T. As a material for the elastic layer 2B, it is possible to use a heat-resistant rubber in which a high heat-conductive filler is mixed. With respect to the thickness of the elastic layer 2B, a thinner elastic layer 2B is more advantageous in terms of the quick starting of the fixing device 114. However, when the elastic layer 2B is excessively thin, an effect of covering the recording material P or the toner T is weakened, so that the thickness of the elastic layer 2B may preferably be in the range from 50 μm to 1 mm, and more preferably be 80 μm or more and 300 μm or less. A parting layer 2C, which is the outermost surface layer of the film 2, is formed of a fluorocarbon polymer (fluorine-containing resin) having a good parting property such that the toner T on the recording material P causes offset. Further, between the elastic layer 2B and the parting layer 2C, a primer layer 2D for ensuring adhesiveness between the elastic layer 2B and the parting layer 2C is provided. In order to easily conduct the heat from the heater 3 to the recording material P and the toner T, the total thickness of the parting layer 2C and the primer layer 2D may desirably be 25 μm or less.

(3-1) Base Material 2A

As the base material 2A, in addition to metal such as SUS (steel use stainless), nickel or nickel alloy, a thermosetting resin material having heat resistivity, strength, durability and the like, such as polyimide or polyamideimide can be used.

(3-2) Elastic Layer 2B

As a material for the elastic layer 2B, e.g., a heat-resistant rubber such as a silicone rubber or a fluorocarbon rubber is used. Particularly, of the silicone rubber, an addition curing silicone rubber is frequently used from the viewpoint of its processing property. That is, the material of the elastic layer 2B is the silicone rubber or the fluorocarbon rubber.

(3-2-1) Addition Curing Silicone Rubber

In general, the addition curing silicone rubber includes organopolysiloxane having an unsaturated aliphatic group, organopolysiloxane having active hydrogen bound to silicon, and a platinum compound as a cross-linking catalyst.

An example of organopolysiloxane having an unsaturated aliphatic group includes the following.

a) Straight-chain organopolysiloxane wherein both molecule terminals are expressed by $R^1{}_2R^2SiO_{1/2}$, and an intermediate unit is expressed by $R^1{}_2SiO$ and $R^1R^2SiO$.

b) Branched polyorganosiloxane wherein $R^1SiO_{3/2}$ to $SiO_{4/2}$ are included in the intermediate unit.

Here, $R^1$ represents a monovalent non-substituted or substituted hydrocarbon group which does not include the aliphatic unsaturated group bonded to a silicon atom. Specifically, the following is included:

c) an alkyl group (for example, methyl, ethyl, propyl, butyl, pentyl, hexyl, and the like);

d) an aryl group (phenyl group); and e) a substituted hydrocarbon group (for example, chloromethyl, 3-chloropropyl, 3,3,3-trifluoropropyl, 3-cyanopropyl, 3-methoxypropyl, and the like).

Particularly, since synthesis and handling are easy and excellent heat resistance can be obtained, 50% or more of $R^2$ is preferably a methyl group, and all $R^2$ are particularly preferable to be the methyl group.

Further, $R^2$ represents the unsaturated aliphatic group bonded to a silicon atom, and a vinyl, allyl, 3-butenyl, 4-pentenyl, 5-hexynyl are illustrated, and since synthesis and handling are easy, and a cross-linking reaction can be easily performed, vinyl is preferable.

Further, organopolysiloxane having the active hydrogen bonded to silicon is a cross-linking agent, which forms a cross-linked structure by the reaction with an alkenyl group of an organopolysiloxane component having the unsaturated aliphatic group by a catalytic action of the platinum compound.

The number of hydrogen atoms bonded to the silicon atom is a number exceeding three pieces in average in one molecule.

As an organic group bonded to the silicon atom, a non-substituted or substituted monovalent hydrocarbon group can be illustrated, which is in the same range as $R^2$ of the organopolysiloxane component having the unsaturated aliphatic group. Particularly, since synthesis and handling are easy, a methyl group is preferable.

A monocular weight of organopolysiloxane having active hydrogen bonded to silicon is not particularly limited.

Further, the viscosity of organopolysiloxane at 25° C. is preferably in the range of 10 $mm^2/s$ or more and 100,000 $mm^2/s$ or less, and more preferably 15 $mm^2/s$ or more and 1,000 $mm^2/s$ or less. The reason why viscosity of the organopolysiloxane at 25° C. is preferably in the above-described range is because it does not happen that desired cross-linking properties and physical properties of molded articles are not obtained due to evaporation during preservation, and moreover, synthesis and handling are easy so that it can be easily diffused in the system.

A siloxane base can be in the shape of any of a straight-chain, branched or circular, and a mixture of these shapes may be used. Particularly, because of easiness of synthesis, the shape of a straight-chain is preferable. A Si—H binding may be present in whichever siloxane unit in the molecule, but at least a part thereof is preferably present in a siloxane unit of the molecule terminal such as an $R^1{}_2HSiO_{1/2}$ unit As the addition curing silicone rubber, the amount of the unsaturated aliphatic group is preferably 0.1 mol % or more and 2.0 mol % or less for silicon atom 1 mol, and particularly, more preferably 0.2 mol % or more and 1.0 mol % or less.

Further, the unsaturated aliphatic groups and active hydrogens are blended in such a ratio that the ratio of the number of active hydrogens to unsaturated aliphatic groups is preferably 0.3 or more and 0.8 or less. The ratio of the number of active hydrogens to unsaturated aliphatic groups can be quantitatively calculated by measurement using Hydrogen Nuclear Magnetic Resonance Analysis (for example, $^1$H-NMR (Model Name: AL400 type FT-NMR made by Nihon Denshi Kabushiki Kaisha). By setting the ratio of the number of active hydrogens to unsaturated aliphatic groups within the above-described numerical range, the hardness of the silicone rubber layer after curing can be stabilized. Further, an excessive rise of the hardness can be suppressed.

(3-2-2) Filler in Elastic Layer 2B and Thermal Conductivity of Elastic Layer 2B As the high heat-conductive filler to be mixed in the rubber material of the elastic layer 2B, it is possible to use alumina, aluminum nitride, boron nitride, carbon, carbon nanofiber, metal silicon, zinc oxide, silicon oxide, etc. These materials can be used singly or in mixture of two or more species. In order to obtain a sufficient fixability, a high heat-conductive rubber having the thermal conductivity of 0.7 W/m·k or more and 2.0 W/m·k or less may desirably be used.

(3-3) Primer Layer 2D

Between the elastic layer 2B and the parting layer 2C, the primer layer 2D for bonding the elastic layer 2B of the silicone rubber and the parting layer of the fluorocarbon polymer is provided. A material for the primer layer 2D is a dispersion containing a crystalline fluorocarbon polymer having a functional group and containing water. The dispersion may preferably contain a crystalline fluorocarbon polymer having no functional group in addition to the crystalline fluorocarbon polymer having the functional group. Examples of the functional group-containing crystalline fluorocarbon polymer are described in JP-A (Tokuhyo) 2002-514181, Japanese Patent No. 2882579 and JP-A 2005-212318. The functional group contributes to the bonding of the parting layer to the elastic layer.

Examples of the functional group may include ester, alcohol, acid, their salts, their halides, cyanate, carbamate, nitrile, etc. Examples of acid may include carbon-based acid, sulfur-based acid, phosphorus-based acid. The functional group-containing fluorocarbon polymer can, e.g., be obtained by copolymerizing a fluorinated monomer having a pendant-type side group containing a functional group unit when the fluorocarbon polymer is manufactured by polymerization. A preferred example of such a functional group may include the phosphorus-based acid, particularly a phosphate group. A preferred example of the fluorinated monomer having the phosphate group as the functional group may include an ester dihydrogenphosphate compound having a trifluoro-vinyl-ether group. A specific example thereof may include dihydrogenphosphate 2,2,3,3,5,6,6,8,9,9-decafluoro-5-trifluoromethyl-4,7-dioxanona-8-ene-1-yl (EVE-P) and dihydrogenphosphate 2,2,3,3,4,4,6,7,7-nonafluoro-5-oxahepta-6-ene-1-yl.

The fluorocarbon polymer is a copolymer which can be obtained by copolymerizing tetrafluoroethylene (TFE) with at least one species of a fluorine substitution comonomer by a known method. Examples of the fluorine substitution comonomer may include perfluoroalkylvinyl compounds having 3-8 carbon atoms, and perfluoroalkylvinylethers (PFAV) in which an alkyl group has 1-5 carbon atoms. A copolymer resin (PFA resin) between TFE and perfluoro-alkyl-vinylether or a copolymer resin between TFE and perfluoroalkylvinyl compound is a preferred fluorocarbon polymer. The functional group-containing fluorocarbon polymer is obtained by copolymerizing the above-mentioned fluorinated monomer containing the functional group unit when the fluorocarbon polymer is manufactured by the polymerization. In a most preferable example, fluorocarbon polymer is the copolymer resin (PFA resin) between TFE having a side chain containing the phosphate group and perfluoroalkylether. The melting point of the functional group-containing fluorocarbon polymer is 200-300° C., and preferably 220-280° C. For that reason, a proportion of the alkylvinylether component or the alkylvinyl component to the copolymer resin is in the range of 3-15 mol. %, and preferably 5-12 mol. %.

The fluorocarbon polymer having no functional group can be used by being appropriately selected from the fluorocarbon polymers described above. Of the fluorocarbon polymers, the TFE/perfluoroalkylvinylether copolymer resin or the TFE/perfluoroalkylvinyl copolymer resin is preferably used. The copolymer in which the proportion of the alkylvinylether component or the alkylvinyl component to the copolymer resin is 3-15 mol. %, preferably 5-12 mol. % is preferable from the viewpoint of a desirable melting point.

In the mixture between the functional group-containing fluorocarbon polymer and the fluorocarbon polymer containing no functional group, the content of the functional group can be adjusted easily and arbitrarily. The functional group-containing fluorocarbon polymer is mixed in an amount of 100-10 wt. %, preferably 80-30 wt. % per the mixture. The mixing of the functional group-containing fluorocarbon polymer with the fluorocarbon polymer containing no functional group can be performed by a known method. The melting point of the mixture may be 200-300° C., and preferable 220-280° C., in consideration of the baking temperature such that the base material is not damaged by heat when the coating of the fluorocarbon polymer is formed on the base material. Therefore, the copolymer in which the proportion of the alkylvinylether component or the alkylvinyl component to the mixture (copolymer resin) is 3-15 mol. %, and preferably 5-12 mol. %, may preferably be used from the viewpoint that the copolymer resin has the desirable melting point. The amount of the functional group in the mixture is 0.02-5 mol. %, and preferably 0.1-2.5 mol. %, per the mixture. The primer layer is formed by using an aqueous dispersion in which the mixture is dispersed as fine particles in an aqueous (water) solvent.

(3-4) Parting Layer 2C

The fluorocarbon polymer for the parting layer 2C is insoluble in solvent, since the fluorocarbon polymer consists of a fluorocarbon polymer mixture containing the crystalline fluorocarbon polymer. For that reason, the fluorocarbon polymer is used in the form of the dispersion in which the fine particles (primary particle size of 830 nm or less) of the fluorocarbon polymer are dispersed in the solvent, such as water. Incidentally, herein, the value of the primary-particle size refers to a measured value by a scanning electron microscope (SEM). The crystalline fluorocarbon polymer has high heat resistivity and high durability and generally has a melting point of 200° C. or more, but in the case where the crystalline fluorocarbon polymer is used for the rotatable fixing member, the rotatable fixing member may preferably withstand continuous use at 200° C. or more. Generally, the polymer causes partial melting even at the melting point or less and a resin-melting temperature range including the melting point as a center value is present, and therefore the melting point may preferably be 250° C. or more for the purpose that the rotatable fixing member withstands continuous use.

Specific examples of the fluorocarbon polymer may include PFA, FEP (tetrafluoroethylene-hexafluoropropylene copolymer), copolymers thereof, and their modified resins. Particularly, PFA has the melting point of 280-320° C. and has a very good heat resistivity and a good processing property, and thus is a suitable material as the fluorocarbon polymer used in the present invention. Generally, a fluorocarbon polymer having a higher melting point was excellent in heat resistivity and durability, but was not melted readily, so that it was difficult to form a film. However, according to the manufacturing method of the present invention, it is possible to obtain a good film-forming property even in the case where the fluorocarbon polymer is PFA, such that the melting point is relatively high, i.e., 300° C. or more at which it has been conventionally difficult to form a film.

(4) Manufacturing Method of Fixing Film 2

(4-1) Formation of Elastic Layer 2B

On the surface of the base material 2A that has been treated with a primer in advance, the elastic layer 2B is formed. As a method of forming the elastic layer 2B, a ring coating method can be used. FIG. 2(*b*) shows an example of a ring coating device used in a step of forming the silicone rubber layer constituting the elastic layer 2B on the base material 2A and is a schematic view for illustrating the so-called ring-coating method. The base material 2A, which is an endless belt member, is put on a cylindrical core 18, which has a perfect circle in cross section and the circumference of the circle is substantially equal to an inner circumferential length of the base material 2A, and is mounted on the core 18. Next, the core 18 on which the base material 2A is mounted, is fixed on a movable stage 34 by a chucking attachment 35. A high heat-conductive, addition-curing, silicone-rubber composition containing the addition-curing silicone rubber and the high heat-conductive filler is filled in a cylinder pump 32. Then, the composition is pressure-fed by a pressure-feeding motor M1, so that the composition is applied from an application-liquid supplying nozzle 33 onto the circumferential surface of base material 2A. At this time, simultaneously with the application, the movable stage 34, on which the base material 2A and the core 18 are fixed, is moved in a rigid direction in FIG. 2(*b*) at a constant speed by a driving motor M2. As a result, the coating film of the addition-curing, silicone-rubber composition G constituting the elastic layer 2B can be formed on the entire outer circumferential surface of the base material 2A. The thickness of the coating film constituting the elastic layer 2B can be controlled by the clearance between the application-liquid supplying nozzle 33 and the base material 2A, the feeding speed of the silicone rubber composition, the movement speed of the base material 2A (stage 34), and the like. The addition-curing, silicone-rubber layer formed on the base material 2A is heated for a certain time by a known heating means, such as an electric furnace or an infrared heater, to promote a cross-linking reaction, thus being formed into the elastic layer 2B, which is a cured-silicone rubber layer. The method of forming the elastic layer 2B is not limited to the ring-coating method described above. For example, it is also possible to use a method in which the material, such as a liquid silicone rubber, is coated in a uniform thickness on the metal layer by a means (method), such as a blade-coating method and then is heat-cured. It is also possible to use a method in which the material, such as the liquid-silicone rubber is injected into a mold and then is heat-cured, a method of heat-curing the material after extrusion molding, a method of heat-curing after ejection molding, and the like.

The surface of the elastic layer 2B may desirably be subjected to a surface treatment before the primer layer 2D is formed. For example, it is desirable a that hydrophilizing treatment is performed through UV treatment (UV irradiation treatment). This UV treatment is not essential, but the silicone-rubber surface is hydrophilized by the UV treatment and the tacking property is lowered, so that the formation of the primer layer 2D having a very small thickness and the formation of the parting layer 2C subsequently effected become easy.

(4-3) Formation of Primer Layer 2D

In order to obtain good surface smoothness of the parting layer 2C, the primer layer 2D on the elastic layer 2B is required to be formed with a thickness of 830 nm or less, and preferably 360 nm or less so as to cover the entire area of the elastic layer 2B. For that purpose, the method of forming the primer layer 2D on the elastic layer 2B may desirably include at least three steps (First to third steps) described below. The first step is a step of applying the dispersion of the primer so as to cover the entire area of the elastic layer. Then, in the second step, the coating layer of the primer layer is dried to obtain a dried primer layer. Then, in the third step, a part of the dried primer layer is removed to decrease and uniformize the layer thickness. Thus, it is desirable that the primer layer is formed by the three steps described above. This is because it is generally very difficult to apply the fluorocarbon polymer dispersion onto the elastic layer 2B with a thickness of 830 nm or less in a single step of the known method. Generally, when the primary-particle size is about 1 μm with respect to fine particles, the Van der Waals force acting among the fine particles is not negligible. The fine particles are liable to agglomerate and are more liable to agglomerate with a smaller-particle size. Particularly, the agglomeration is liable to occur when the particles are being dried. For that reason, in the case where the dispersion is only applied with a small thickness by the known method, the primary particles agglomerate together and are dried in a state in which the primary particles form aggregate or layer of several μm or more in primary-particle size. For that reason, only applying and drying the primer through the general method, it is substantially impossible to form a uniform layer having a thickness of 830 nm or less. Therefore, the coating (application) layer of the dispersion is first formed in advance in the first step and the dried primer layer is formed in the second step, and then in the third step, the part of the dried primer layer is removed to adjust the layer thickness to 830 nm or less. In a final fourth step, the primer layer decreased in thickness is coated with the crystalline fluorocarbon polymer, followed by baking to obtain the parting layer.

In the first step, the application of the fluorocarbon polymer-dispersed aqueous paint, which is the primer, onto the elastic layer may be performed by a known method, such as spraying or dipping. The drying in the second step may be performed by drying through natural drying or air blowing, so that the dried primer layer can be formed. In the dried primer layer, mud cracks may preferably be created by adjusting the solid content of the fluorocarbon polymer in the fluorocarbon polymer-dispersed aqueous point as the primer, and an application amount and a drying method of the paint, and the like. With respect to the mud-cracked dried primer layer, the subsequent third step can be performed very easily. The cracks are liable to occur with an increasing thickness, but when the paint is applied in an excessive large thickness, dropping occurs and utilization factor is poor. Therefore, the thickness of the primer layer may desirably be about 4 μm to about 7 μm.

The removal in the third step can be performed by using a method in which an abutting member (scraping member), such as cloth, paper or sponge, scrapes against the dried primer layer to scrape the surface of the dried primer layer off the dried primer layer. Further, it is possible to use a method in which the surface of the dried primer layer is blown off with high-pressure air or gas (by blowing the air or gas onto the dried primer layer). It is also possible to use a method in which the surface of the dried primer layer is washed with a liquid such as water or other liquids, and the like method. The primer particles present immediately on the elastic layer at the lowermost layer portion, physically and chemically bond to the elastic layer with a force stronger than the adhesion force among the primer particles, thus being removed less frequently compared to the primer particles present above those present immediately on the lowermost layer portion.

Generally, the surface of the silicone rubber has strong water repellency due to its chemical structure. When the water repellency is strong, the primer dispersion is repelled by the silicone rubber surface, so that the primer dispersion is not readily applied onto the entire surface of the elastic layer. In addition to water repellency, the elastic layer possesses a tacking property. When the tacking property is excessively strong, friction between a nonwoven fabric ("BEMCOT", mfd. by Asahi Kasei Fibers Corp.) which is the abutting member and the roller becomes excessively strong, so that the abutting member is liable to vibrate and therefore, the uniform removal in the removing step described above is less liable to be effected. For this reason, in order to lower the surface water repellency and the tacking property, it is desirable that the surface of the elastic layer 2B is subjected to the UV treatment. The degree of the UV treatment may desirably be such that the lowering in water repellency is at a level that it can be recognized. As an index thereof, the surface of the elastic layer 2B may be UV-treated so that the contact angle with pure water is 90 degrees or less as measured by a contact angle meter ("FACE", mfd. by Kyowa Interface Science Co., Ltd.). As a result, crawling during the dispersion application and vibration in the removing step do not readily occur, so that the primer layer, which is a thin layer, can be uniformly formed on the surface of the elastic layer 2B easily. However, even in the case where the elastic layer has the tacking property, by repeating the abutting step of the nonwoven fabric (BEMCOT), it is possible to finally obtain a uniform thin primer layer 2D. Generally, the wavelength of visible light is about 360 nm to 830 nm, and when the surface unevenness (roughness) is smaller than the visible-light wavelength, diffused reflection of visible light is suppressed, and therefore, the surface gloss becomes very good.

When the surface unevenness is extended on the primer layer 2D, the surface smoothness of the parting layer 2C is largely impaired by the influence of the surface unevenness. However, when at least the thickness of the primer layer 2D is 830 nm or less, the degree of the surface unevenness of the primer layer 2D is not more than the visible-light wavelength. That is, the thickness of the primer layer obtained by the forming step described above may preferably be not more than the lower limit of the visible-light wavelength. As a result, the diffused reflection of visible light is prevented, so that the viewer feels that the fixing film has a good gloss. Particularly, when the thickness of the primer layer 2D is not more than 360 nm, which is the lower limit of the visible-light wavelength, the unevenness of not less than the visible-light wavelength cannot be present. Thus, the diffused reflection does not occur in the entire wavelength region of visible light.

Figure 3:
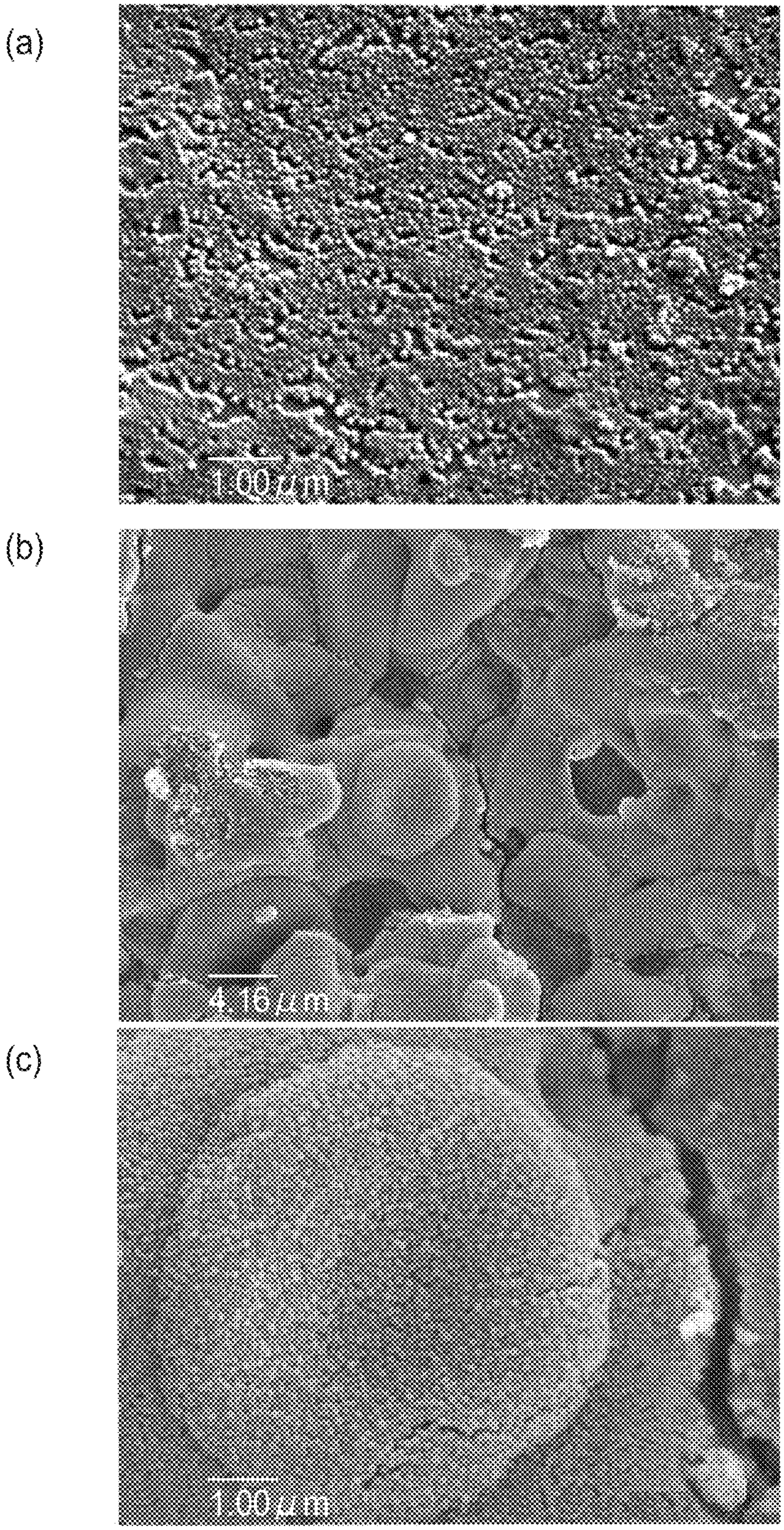
FIG. 3(*a*) is a scanning electron microscope (SEM) photograph showing a state of a primer layer in Embodiment 1, FIG. 3(*b*) is an SEM photograph showing a state, in which coating grains are fixed and laminated without being subjected to leveling, of the primer layer formed by dry coating in Comparative Embodiment 1, and FIG. 3(*c*) is an SEM photograph showing the state of the primer layer formed by dry coating in Comparative Embodiment 1 and is also an enlarged photograph of fixed grains shown in FIG. 3(*b*) with the same magnification as that in FIG. 3(*a*).

The primer layer 2D is constituted by fine particles of the fluorocarbon polymer mixture containing the crystalline fluorocarbon polymer as the primer. For that reason, the primary-particle size of the fine particles of the fluorocarbon polymer mixture is required at least to be 830 nm or less. In order to obtain a particularly good gloss surface, it is desirable that the fine particles having the primary-particle size of 360 nm or less are used. Particularly, when the primary-particle size of the fluorocarbon polymer primer is 360 nm or less, the fine particles are not scraped off even when the cloth abutting member is abutted against the primer layer, so that the primer particles at the lowermost portion (contacting the elastic layer 2B) are further liable to remain. That is, the dispersion of the fluorocarbon polymer mixture to be applied onto the surface of the elastic layer 2B in order to form the dried primer layer may preferably contain the fluorocarbon polymer fine particles having the primary-particle size of 360 nm or less. By adjusting an abutting force or the like of the abutting member, it is possible to create a state as shown in FIG. 3(*a*) in which only a single-particle layer of the fluorocarbon polymer primer primary particles present at the lowermost portion (contacting the elastic layer 2B) of the primer layer 2D is left. FIG. 3(*a*) is an SEM (scanning electron microscope) photograph showing the state of the primer layer 2D in which only the single-particle layer is left. The thickness of the primer layer 2D is not always required to be 850 nm or less in the entire area. Even when a portion of 1 μm or more and several μm or less is locally present, such thickness may be permitted if the portion is inconspicuous when the portion is covered with the parting layer 2C. Further, the primary-particle layer may also be locally omitted and 70% or more of an area of the primer-layer surface may only be required to be formed on the smooth surface of 850 nm or less in thickness. When the area in which the primer particles are not placed on the elastic layer 2B is less than 30%, it is possible to obtain a good bonding property together with good gloss. When the thin primer layer having a thickness of not more than the visible-light wavelength is formed on the elastic layer 2B, structural color can appear on the elastic layer surface by the optical (light) interference phenomenon. This phenomenon of the appearance of the structural color is generally a phenomenon of the interference visible light causes to produce the structural color, based on a minute structure of not more than the visible-light wavelength, so that the presence of the primer layer of the fluorocarbon polymer primer fine particles of the visible-light wavelength on the elastic layer can be confirmed by checking the presence or absence of the appearance of the structural color. Particularly, when the primer layer 2D is formed in the single-particle layer of the primary particles of the primer, it is possible to produce a desired structural color by adjusting the primary-particle size. That is, reflected light at the surface of the primer layer 2D and reflected light at the surface of the elastic layer 2B, which is below the surface of the primer layer 2D, reflected by a thickness of particles corresponding to the primary-particle size, interfere with each other, so that the structural color appears. Therefore, it is possible to produce a desired structural color by adjusting the thickness, i.e., the primary-particle size. For that reason, also in the manufacturing process or the like, by checking for the presence or absence, of the structural color and the unevenness of the structural color, it is possible to easily confirm and control the formation of a desired primer layer. That is, after the primer-layer formation, a primer layer forming state is controlled by producing the desired structural color on the surface of the primer layer.

(4-4) Formation of Parting Layer 2C

The fluorocarbon polymer for the parting layer 2C used in the present invention is the crystalline fluorocarbon polymer and is insoluble in the solvent. For that reason, the fluorocarbon polymer is used in the form of a dispersion of fluorocarbon polymer fine particles (primary particle size: 830 μm or less, preferably 360 nm or less) in the solvent such as water. Incidentally, herein, the value of the primary-particle size refers to a measured value by the SEM. In the present invention, of the fluorocarbon polymers, it is possible to use the fluorocarbon polymer having a particularly high heat resistance and durability. Generally, the high heat-resistant fluorocarbon polymer has a high durability and can be used when the fluorocarbon polymer has the melting point of 250° C. or more, and it is desirable that good durability can be obtained when the crystalline fluorocarbon polymer having a melting point of 300° C. or more is used. As the applying method of the fluorocarbon polymer dispersion for the parting layer, a method of forming an unbaked smooth fluorocarbon polymer layer with less surface unevenness by leveling the dispersion on the roller surface may be used. Particularly, spray coating is preferred from the viewpoint of ease of handling, but dipping can also be used, and the unbaked fluorocarbon polymer layer to be formed as the parting layer 2C is liable to be cracked during drying or baking after the coating with an increasing thickness of the coating. On the other hand, with a decreasing thickness of the coating, the leveling of the dispersion is less liable to be performed during the coating, so that spots are liable to occur. The thickness of the coating may desirably be in the range of 4 μm or more and 30 μm or less. One of the features of the coating method is that the primer layer 2D is a very thin layer and has a small unevenness, and therefore, the surface of the parting layer 2C can be made very smooth while suppressing thermal deterioration of the rubber of the elastic layer 2B. Particularly, this effect is noticeable with the decreasing thickness of the coating, so that a very good surface can be formed even when the thickness of the parting layer 2C is 15 μm or less. Generally, when the thickness of the parting layer 2C is 15 μm or less, the state of the primer layer 2D is liable to appear. On the other hand, with an increasing thickness of the parting layer 2C from 15 μm, by a leveling action of the parting layer itself, the influence of the parting layer 2C on the surface of the underlying primer layer 2D is gradually alleviated and thus becomes inconspicuous.

A baking means for baking the unbaked fluorocarbon polymer layer to be formed as the parting layer 2C may only be required to heat the unbaked fluorocarbon polymer layer to a temperature which is at least not less than the melting point of the fluorocarbon polymer. Examples of the baking means may include an electric oven for circulating hot air, an infrared heater for effecting radiation heating, and a means for baking the unbaked fluorocarbon polymer layer by locally creating high-temperature air through a cylinder-like or coil-like, heat-generating element and then by passing the layer through the locally hot air. However, the elastic layer 2B underlying the parting layer 2C generally does not have the heat resistance like that of the fluorocarbon polymer, so that the baking means and a baking method are required to be performed in a manner such that the film-forming property of the parting layer and minimization of deterioration of the elastic member.

As the elastic member for the elastic layer 2B excellent in heat resistance, the addition-curing silicone rubber frequently used for the fixing roller may be used, but the heat-resistant temperature thereof is generally about 250° C. The melting point of the fluorocarbon polymer used for the fixing roller in this embodiment may be 250° C. or more, and preferably 300° C. or more. Further, the baking is generally performed at a temperature which is higher than the melting point by 30° C. to 50° C., so that the deterioration of the elastic member cannot be avoided, although a degree thereof is different, and therefore, there is a need to employ a manufacturing method in which the deterioration is minimized. The baking may preferably be performed for 7 minutes or less as a time at which the temperature is not less than the melting point of the crystalline fluorocarbon polymer of the parting layer described above.

A significant feature of the present invention is that the above-described fluorocarbon polymer dispersion, which has a high heat resistance and high durability, and is insoluble in the solvent, is used as the primer on the elastic layer 2B. Further, in the case where the parting layer 2C of the above-described fluorocarbon polymer, which has high heat resistance and high durability, and is insoluble in the solvent is formed, a high parting property and a high smoothness can be obtained while baking the parting layer 2C so that the influence on the elastic layer 2B is small. According to the constitution and manufacturing method of the present invention, the thickness itself of the primer layer 2D is 830 nm or less, i.e., is not more than the visible-light wavelength (region), so that the resultant surface unevenness is also not more than 830 nm. For this reason, the primer layer 2D, which is very smooth and is free from a crack, can be formed. For that reason, the parting layer 2C to be formed on the primer layer 2D can be formed very smoothly at its surface already in a state before the baking. Also, during baking, the underlying primer layer 2D is a very thin layer. For that reason, even when a crack is generated in the primer layer 2D, a step height thereof is not more than (the lower limit of) the visible-light wavelength, so that it is possible to form a very smooth film with no influence on the surface gloss and without largely disturbing the surface smoothness.

(5) Advantages of Present Invention

Figure 4:
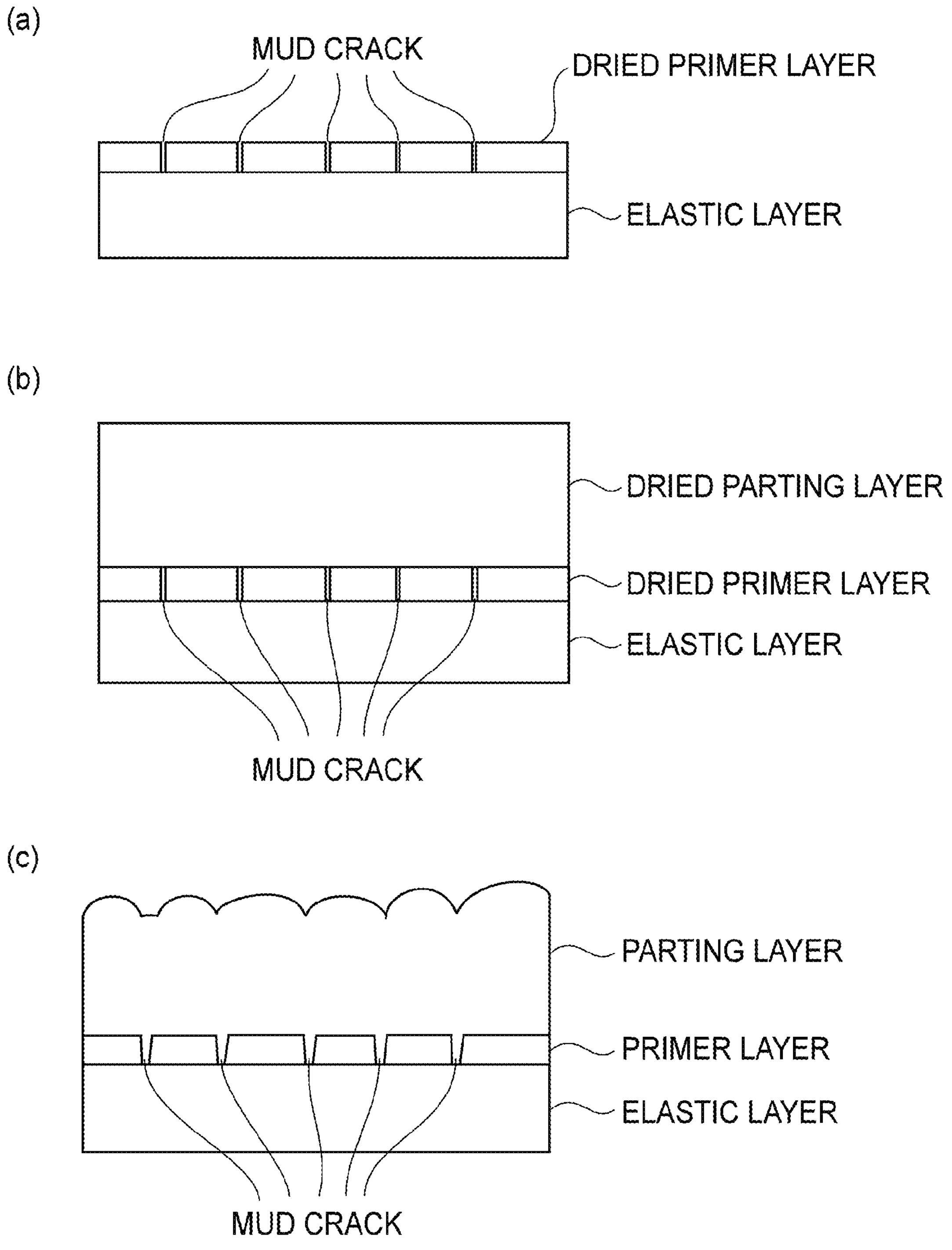
FIG. 4(*a*) is a schematic view showing a state of a primer layer formed by wet coating in Comparative Embodiment 4, FIG. 4(*b*) is a schematic view showing a state in which a parting layer is applied onto the primer layer formed by wet coating and then is dried, and FIG. 4(*c*) is a schematic view showing a state in which the parting layer is applied onto the primer layer formed by wet coating and then dried and baked.
Figure 5:
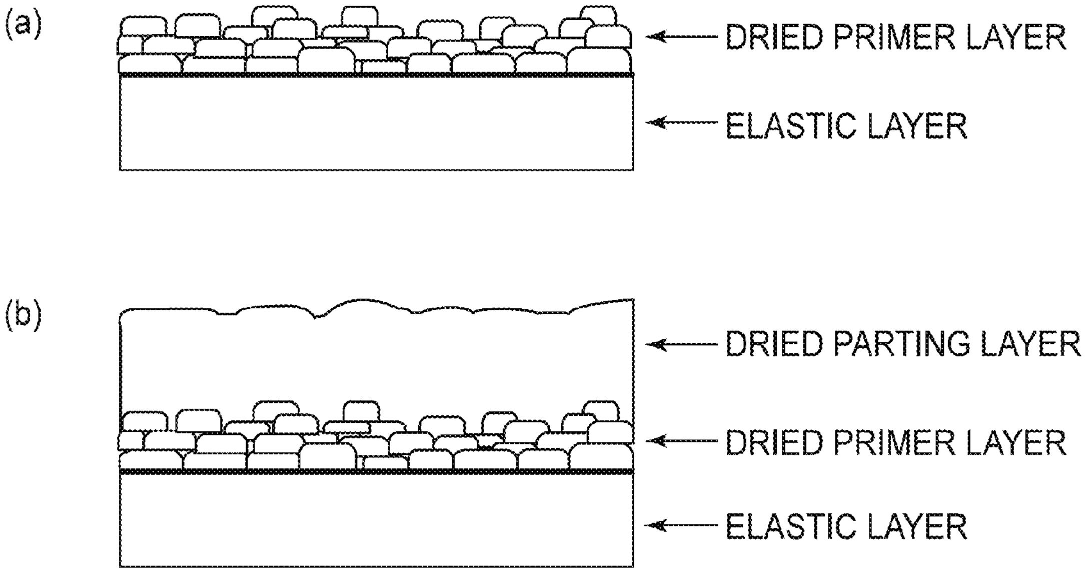
FIG. 5(*a*) is a schematic view showing a state of a primer layer formed by dry coating in Comparative Embodiment 1, and FIG. 5(*b*) is a schematic view showing a state in which a parting layer is applied onto the primer layer formed by dry coating and then is dried in Comparative Embodiment 1.

In general, the fluorocarbon polymer primer does not contain a binder component, for the purpose of preventing a mud crack from occurring during the drying and the baking, in a large amount. This is because when the amount of the binder component is large, the amount of a substance that is vaporized during the baking is increased and trapped by the parting layer on the primer layer, and therefore, the binder component adversely affects the film-forming property and impairs the bonding property. The fluorocarbon polymer primer dispersion, which does not contain the binder component in the large amount, is liable to cause a mud crack during the drying. Particularly, when the dispersion is coated uniformly on the elastic member so as to effect leveling in a so-called wet state (in which the dispersion is not dried soon on the elastic member), a crack occurs easily during the drying. When the parting layer 2C in a state in which a mud cracks occur during the drying (FIG. 4(*a*)) is coated (FIG. 4(*b*)) and then baked, as schematically illustrated in FIG. 4(*c*), the cracks are enlarged by the influence of expansion of the base material 2A and the elastic layer 2B during baking, so that the parting-layer surface is largely roughened. As a coating method for preventing the occurrence of a mud crack during the drying, a general dry coating in spray coating, i.e., a method in which paint particles of the fluorocarbon polymer primer dispersion to be blown with a spray are made small to facilitate drying thereof after being deposited on the elastic layer surface, may be used. Further, it is also possible to use a method in which the elastic member is heated and the fluorocarbon polymer dispersion is applied so that the paint particles are dried immediately after being deposited on the elastic member and thus small paint particles (FIG. 3(*c*)) are laminated. However, in general, in the spray-coating method, the paint particles can be made small, but cannot be formed with a size of less than 1 μm, so that as shown in FIGS. 3(*b*) and 3(*c*), the paint particles have an outer size of 5 μm to several tens of microns and a thickness of about 2 μm already after the paint particles are deposited and dried on the surface of the elastic layer 2B. FIG. 3(*b*) is the SEM photograph showing a state of the primer layer formed by the dry coating (a state in which the paint particles are fixed and laminated without being leveled). FIG. 3(*c*) is the SEM photograph showing the state of the primer layer formed by the dry coating (enlarged fixed paint particles). The primer layer laminated on the elastic layer 2B by being repeatedly coated on the elastic layer 2B so as to cover at least the entire surface area of the elastic layer 2B has a final thickness of 4-6 μm (FIG. 5(*a*)). Further, the surface state thereof is, as shown in FIG. 3(*b*), of such a roughened state, that a large amount of surface unevenness is present due to the shape of the fixed-paint particles. In the case where the primer layer has the surface unevenness as described above, the surface of the parting layer 2C on the primer layer 2D is influenced by the surface unevenness of the primer layer, and thus is liable to have an uneven surface (FIG. 5(*b*)).

As described above, there are the case where the parting-layer surface is disturbed by progression of the crack in the primer layer during the baking, and the case where the surface of the unbaked parting layer (the parting layer after the drying) is not smooth due to the surface unevenness of the primer layer. In these cases, in order to obtain a good surface property and gloss, the fluorocarbon polymer for the parting layer is baked at a higher temperature or for a longer time. As a result, the fluorocarbon polymer is sufficiently melted and leveled and thus the parting-layer surface is required to be smoothened. However, in this case, it is considerably feared that the underlying elastic layer is thermally deteriorated.

Figure 6:
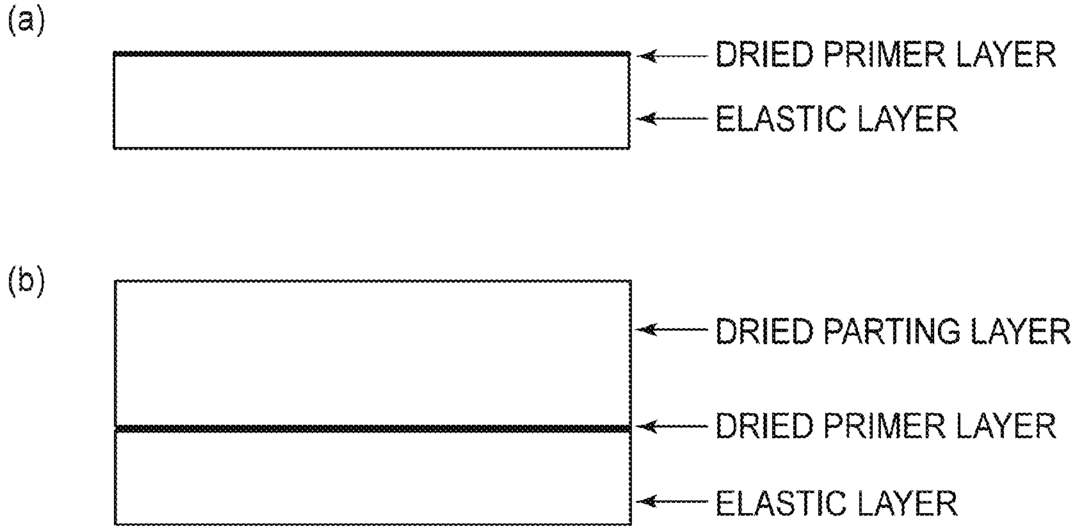
FIG. 6(*a*) is a schematic view showing a primer layer in Embodiment 1, and FIG. 6(*b*) is a schematic view showing a state in which a parting layer is applied onto the primer layer and then is dried in Embodiment 1.

On the other hand, in the present invention, when the primer layer 2D itself has a very smooth surface and is thin (FIG. 6(*a*)), the unbaked parting-layer surface itself (after the drying) has already been very smooth and has a good surface property (FIG. 6(*b*)). Further, the primer layer 2D is very thin and does not readily cause a crack, so that the crack is also not readily generated in the parting layer itself during the baking, and therefore, the parting-layer surface is not largely disturbed during the baking. Therefore, it is possible to obtain a very good smooth surface in the present invention without particularly making the baking temperature high or performing the baking for a long time, i.e., without sufficiently softening and melting the parting layer during the baking so as to be sufficiently leveled. Further, as a result, the thermal deterioration of the elastic layer during the baking can be suppressed. Thus, even when the fluorocarbon polymer of a high melting-point grade, such that the leveling is not readily performed and the melting point is 310° C. or more is used as the fluorocarbon polymer for the parting layer 2C, the good smooth surface can be formed easily. Further, the fluorocarbon polymer having a melting point of 310° C. or more has an especially good heat resistivity and durability among the fluorocarbon polymers, so that the present invention is also characterized in that the parting layer 2C has a good surface property and has the good heat resistivity and durability. Further, the present invention is particularly suitable for the case where the total thickness of the primer layer 2D and the parting layer 2C is 15 μm or less. This is because the unevenness of the primer layer is conspicuous as the surface unevenness of the parting layer with a smaller thickness of the parting layer. In the present invention, the primer layer 2D has a thickness of 830 nm or less, and thus, is very thin and smooth, so that the conspicuous unevenness cannot be created, and thus, a good film can be formed with no problem even when the thickness of the parting layer 2C is small.

Further, with respect to the rotatable fixing member in which the heat is transferred between the elastic layer and the parting-layer surface, the layer thickness on the elastic layer, i.e., the fixability is disadvantageous as the total thickness of the primer layer and the parting layer is larger. Further, as the primer-layer thickness and the parting-layer thickness approach each other, in the constitution of the rotatable fixing member, tolerances of both of the thicknesses influence the fixability, so that a variation in fixability is liable to occur. On the other hand, in the constitution of the present invention, with respect to the primer-layer thickness, the parting-layer thickness is substantially different by several tens of times to several hundreds of times, so that the primer layer thickness itself is less liable to cause a problem. Therefore, the tolerance of the primer-layer thickness is substantially negligible and thus the layer thickness on the elastic layer is within the variation caused by substantially only the tolerance of the parting layer, so that a stable fixability can be ensured compared with the case where the primer layer is formed with a large thickness.

(6) Primer-Layer Thickness Measuring Method

The primer-layer thickness immediately after the primer-layer formation can be measured directly by using a laser scanning microscope or the SEM. Further, even after the baking, the thickness of the primer layer 2D can be verified by using the following method. For example, a cross-sectional sample is analyzed by TOF-SIMS (time of flight secondary ion mass spectrometer), so that a molecular structural difference between the fluorocarbon polymers of the primer layer and the parting layer is detected to check the thickness of the primer layer 2D. With respect to the molecular-structural difference, the primer has the functional group as described above, and thus, the presence or absence of the functional group may be checked, and it is also possible to check the difference by effecting mapping as a difference in fluorocarbon polymer itself, a difference in monometer structure, a difference in structure or number of side chain, and the like. Further, as another method, e.g., the cross-sectional sample is prepared and then the molecular-structural difference can be observed by measuring a component intrinsic to the primer layer or the parting layer through elemental analysis using a transmission electron microscope (TEM) or the SEM. Further, as a simple non-destructive inspection, it is possible to use an attenuated total-reflection method in which a crystal having a known analysis depth is pressed against the roller surface and a change in infrared (IR) spectrum due to the molecular-structural difference between the primer layer and the parting layer is detected while checking a penetration length of the crystal.

(7) Examples of Embodiment 1

Specific examples of the fixing film 2 which is the rotatable fixing member in Embodiment 1 will be described.

(7-1) Fixing Film Manufacturing Method in Examples 1 to 3

The fixing films in Examples 1 to 3 have the same constitution except for their thicknesses.

(7-1-1) Preparation of Elastic Layer for Fixing Film

As the base material 2A, an SUS metal belt (flexible endless belt member) having a length of 240 mm, a thickness of 40 μm and an outer diameter of 30 mm was used. On an outer circumferential surface of the base material 2A, a primer ("DY39-051", mfd. by Dow Corning Toray Co., Ltd.) was uniformly coated with a thin layer in an area of 230 mm in length. Then, the resultant structure was placed in an electric oven and was dried at 200° C. for 30 min. As a material for the elastic layer 2B, a high heat-resistant silicone rubber ("SE4400", mfd. by Dow Corning Toray Co., Ltd.) which contained a heat-conductive filler in advance and had thermal conductivity of about 1 W/m·k was used. This silicone rubber was coated on the primer application area (300 μm in thickness and 230 mm in length) on the base material 2A by the ring-coating method (FIG. 2(*b*)) to form a film, and then the film was subjected to primary vulcanisation at the surface temperature of 140° C. for 10 minutes by the infrared heater while rotating the roller. Next, by baking the vulcanized silicone rubber at 200° C. for 4 hours, secondary vulcanization was performed while bonding the cylindrical silicone rubber to the SUS metal belt (base material).

(7-1-2) Formation of Primer Layer for Fixing Film

Next, the surface of the elastic layer 2B formed on the SUS metal belt 2A was subjected to UV treatment. This UV treatment is not essential, but by the UV treatment, the tacking property of the silicone rubber surface is lowered and the water repellency of the silicone rubber surface is changed into a hydrophilic property, so that a subsequent decrease in thickness of the primer layer and formation of the parting layer become easy to achieve. After the UV treatment was performed, of the materials for the fluorocarbon polymer described above, the fluorocarbon polymer having the phosphoric group and the primary particle size of 150 nm was used and dispersed in water and the resultant dispersion was coated on the elastic layer 2B. That is, this step is a first step of forming a dispersion-application layer by applying the dispersion of the fluorocarbon polymer mixture onto the elastic layer 2B. Then, the application layer was dried by hot air with a drier to form an about 4 μm-thick layer in which mud cracks were generated. That is, this step is a second step of forming a dried primer layer by drying the dispersion-application layer. Next, most of the primer layer is scraped off by pressing the non-woven fabric ("BEMCOT") against the primer layer surface while rotating the belt on which the dried primer layer was obtained in the second step, so that the dried primer layer can be changed into a uniform thin layer. That is, this step is a third step of decreasing the thickness of the dried primer layer by removing a part of the dried primer layer.

The primer is constituted by spherical-fixing-device fine particles having a primary particle size of about 150 nm, so that the primer fine particles are liable to pass through a gap between the pressed non-woven fabric and the silicone-rubber elastic layer. Further, the primer fine particles present at an interface of the silicone rubber are physically and chemically adsorbed by the silicone-rubber surface, so that the primer fine particles are not readily scraped off and therefore are little removed by a manner of rubbing the primer fine particles several times with the non-woven fabric, while pressing the non-woven fabric against the primer fine particles. However, the particle layer on the layer constituting the interface is not largely influenced by the silicone rubber, so that the particle layer is liable to be removed more than the interfacial particle layer. As a result, it is possible to form the primer layer, which is an ultrathin layer (substantially single particle layer of 150 nm in thickness) principally comprising fine particles substantially present at the interface of the primer layer with the elastic layer 2B of the silicone rubber. Further, at the entire surface of the primer layer on the elastic layer 2B, it was confirmed that clear blue structural color appears uniformly by the thin primer layer.

(7-1-3) Coating of Parting Layer for Fixing Film

Next, on the above-treated (ultrathin) primer layer, a PFA dispersion is spray-coated as the parting layer 2C. As the PFA dispersion, a dispersion of PFA ("HP350" (primary particle size: about 160 nm), mfd. by Du Pont-Mitsui Fluorochemicals Co., Ltd.) in water is used and is coated by a spray. In this case, by adjusting an application amount and the number of reciprocation, the coating was made so that the surface was wet, i.e., was sufficiently leveled until it was dried. The coating was effected so that the parting layer had a thickness, including the primer layer thickness, of 5 μm in Example 1, 8 μm in Example 2 and 15 μm in Example 3.

(7-1-4) Baking of Parting Layer for Fixing Film

The fixing film after being subjected to the parting-layer coating was dried at 90° C. for 10 minutes, pre-heated at 220° C. for 30 minutes, and placed in an electric oven kept at 350° C., and then was baked for 7 minutes, followed by air-cooling. As a result, three fixing films of Example 1 (parting layer thickness: 5 μm), Example 2 (parting layer thickness: 8 μm) and Example 3 (parting layer thickness: 15 μm) in Embodiment 1 were obtained.

(7-2) Comparative Embodiments

In order to substantiate the effect of the present invention, comparative embodiments in which the primer-layer application manner and the form of the primer layer and the parting layer are different from Embodiment 1 are shown below.

(7-2-1) Comparative Embodiment 1 and Comparative Embodiment 2

The manufacturing method of fixing films of Comparative Embodiment 1 and Comparative Embodiment 2 are identical to that in Embodiment 1 except for a manner of formation of the primer layer. Further, the fixing films of Comparative Embodiments 1 and 2 are only different in parting-layer thickness. Until the UV treatment, the same process as in Examples 1 to 3 in Embodiment 1 was performed and the primer layer was coated by dry coating in place of the wet coating. That is, when the primer is coated by the spray, an end opening of a spray gun was narrowed by adjusting the spraying pressure and the needle position to decrease the size of the spray-coating particles. Further, the deposition amount on the roller surface per ½ of the reciprocation was decreased so that the spray-coating particles were not leveled with each other and were fixed on the elastic layer surface in a state in which graininess was retained (in a state in which the spray-coating particles reached the elastic-layer surface) when the spray-coating particles were deposited on the roller surface. As a result, the primer layer was formed with a thickness of about 4 μm in a state in which the spray-coating particles of the fluorocarbon polymer primer dispersion were stacked as shown in FIG. 3(*b*). The primer layer was not subjected to the removal step, and then the parting layer was formed in the same manner as in Embodiment 1 so that the (total) thickness of the parting layer (including the primer layer thickness) was 8 μm (Comparative Embodiment 1) and 15 μm (Comparative Embodiment 2). Further, after the parting layer was coated, the baking and the air-cooling were also performed in the same manner as in Embodiment 1 to obtain a fixing film of Comparative Embodiment 1 (total thickness: 8 μm) and a fixing film of Comparative Embodiment 2 (total thickness: 15 μm).

(7-2-2) Comparative Embodiment 3

The manufacturing method of a fixing film of Comparative Embodiment 3 is identical to that of Comparative Embodiment 2 except for the baking method of the parting layer. That is, the fixing film after the drying at 90° C. for 10 minutes and the pre-heating at 220° C. for 30 minutes was placed in the electric oven kept at 360° C. and then was baked for 10 minutes.

(7-2-3) Comparative Embodiment 4

The manufacturing method of a fixing film of Comparative Embodiment 4 is identical to that of Comparative Embodiment 2 except for the baking method of the parting layer. That is, the fixing film after the drying at 90° C. for 10 minutes and the pre-heating at 220° C. for 30 minutes was placed in the electric oven kept at 370° C. and then was baked for 7 minutes.

(7-2-4) Comparative Embodiment 5

The manufacturing method of a fixing film of Comparative Embodiment 5 is identical to that in Embodiment 1 except for a manner of formation of the primer layer. Until the UV treatment of the primer layer, the same process as in Embodiment 1 was performed and the primer layer was coated by the wet coating. That is, when the primer is coated by the spray, an end opening of a spray gun was increased by adjusting the spraying pressure and the needle position to increase the size of the spray coating particles. Further, the deposition amount on the roller surface per ½ of reciprocation was increased, so that the spray-coating particles were coated and leveled with each other when the spray-coating particles were deposited on the roller surface. As a result, the primer layer was formed with a thickness of about 4 μm, but mud cracks occurred in the primer layer as schematically illustrated in FIG. 4(*a*). The primer layer was not subjected to the removal step, and then the parting layer was formed in the same manner as in Embodiment 1 so that the (total) thickness of the parting layer (including the primer-layer thickness) was 15 μm. Further, after the parting layer was coated, the baking was also performed in the same manner as in Embodiment 1 (Examples 1 to 3) to obtain a fixing film of Comparative Embodiment 5.

(8) Performance Comparison Between Examples in Embodiment 1 and Comparative Embodiments With respect to the above-prepared fixing films of Examples 1 to 3 in Embodiment 1 and the fixing films of Comparative Embodiments 1 to 5, the surface properties (surface unevenness, gloss feeling, and the presence or absence of a rubber blister) and an image gloss value (glossiness) when each of the fixing films was incorporated in the fixing device and a color image on the recording material was heat-fixed were compared. The results are shown in Table 1.

TABLE 1

| EMB. NO. | PRIMER LAYER THICKNESS | PARTING LAYER THICKNESS | BAKING CONDITION (° C./MIN.) | SURFACE STATE*1 | GLOSS FEELING | IMAGE GLOSS VALUE | RUBBER BLISTER*2 |
|---|---|---|---|---|---|---|---|
| EMB. 1 EX. 1 | 150 nm | 5 μm | 350/7 | A | A | 74 | A |
| EMB. 1 EX. 2 | 150 nm | 8 μm | 350/7 | A | A | 71 | A |
| EMB. 1 EX. 3 | 150 nm | 15 μm | 350/7 | A | A | 65 | A |
| COMP. EMB. 1 | ca. 4 μm dry | 8 μm | 350/7 | C | C | 38 | A |
| COMP. EMB. 2 | ca. 4 μm dry | 15 μm | 350/7 | B | B | 50 | A |
| COMP. EMB. 3 | ca. 4 μm dry | 8 μm | 360/10 | B | B | 53 | B |
| COMP. EMB. 4 | ca. 4 μm dry | 8 μm | 370/7 | B | B | 55 | C |
| COMP. EMB. 5 | ca. 4 μm wet | 15 μm | 350/7 | D | D | 35 | A |

*1"A" represents good, "B" represents that surface unevenness somewhat occurred, "C" represents that surface unevenness occurred, and "D" represents that surface unevenness considerably occurred.
*2"A" represents that the rubber blister did not occur, "B" represents that the rubber blister slightly occurred, and "C" represents that the rubber blister somewhat occurred.

In Table 1, the "surface state" is an observation result when the surface of each of the fixing films is observed through an optical microscope with 50-fold magnification. Further, the "gloss feeling" is evaluated relatively in four grades (A: Excellent, B: Good, C: Somewhat poor, D: Poor) when the surface of each of the fixing films is observed by eyes. The "Glossiness (image gloss value)" is a measured gloss value by a handy gloss meter ("PG-1" (at 75 deg.), mfd. by Nippon Denshoku Industries Co., Ltd.) when a solid image of a secondary color of blue is fixed on letter (LTR) paper. Further, the "rubber blister" is such a phenomenon that the elastic layer silicone rubber is decomposed by high-temperature thermal deterioration during baking to cause local swelling (blister).

From the results of Table 1, it is understood that good effects in terms of the surface properties are achieved in Examples 1 to 3 in Embodiment 1 of the present invention. Particularly, compared with the case where the primer is dry-coated as in Comparative Embodiment 1, the better surface properties and the better gloss values are obtained in Examples 1 to 3 in Embodiment 1. In this embodiment, even when the thickness of the parting layer is decreased, the surface smoothness is not lowered and the gloss value is not decreased. On the other hand, with respect to the total thickness of 15 μm and 8 μm, in Comparative Embodiments 1 to 5, the surface properties and the gloss values are lowered. From comparison between Example 2 in Embodiment 1 and Comparative Embodiments 3 and 4, in the case where the primer is coated by the dry coating, even when the baking temperature is increased or the baking temperature is prolonged, the surface properties and the glass values in Comparative Embodiments 3 and 4 do not reach levels of Example 2 in Embodiment 1. Moreover, in Comparative Embodiments 3 and 4, the blister due to the thermal deterioration of the rubber has occurred. Further, in Comparative Embodiment 5 in which the fixing film is prepared by wet-coating the primer, it is understood that cracks occur at the primer layer surface and both of the surface properties and the gloss value are not good.

In Embodiment 1 of the present invention, the film-heating-type fixing device 114 is used as the fixing device and the fixing film 2 is used as the rotatable fixing member. However, when only the base material for the fixing film 2 is used as it is for a cylindrical rigid-metal member, the base material can also be used as the fixing roller or the pressing roller for the fixing-roller-type fixing device. When the base material is the cylindrical rigid-metal member, the base material can be formed in the fixing roller or the pressing roller in which the heater is incorporated.

Embodiment 2

(2) Fixing Device 115

Figure 7:
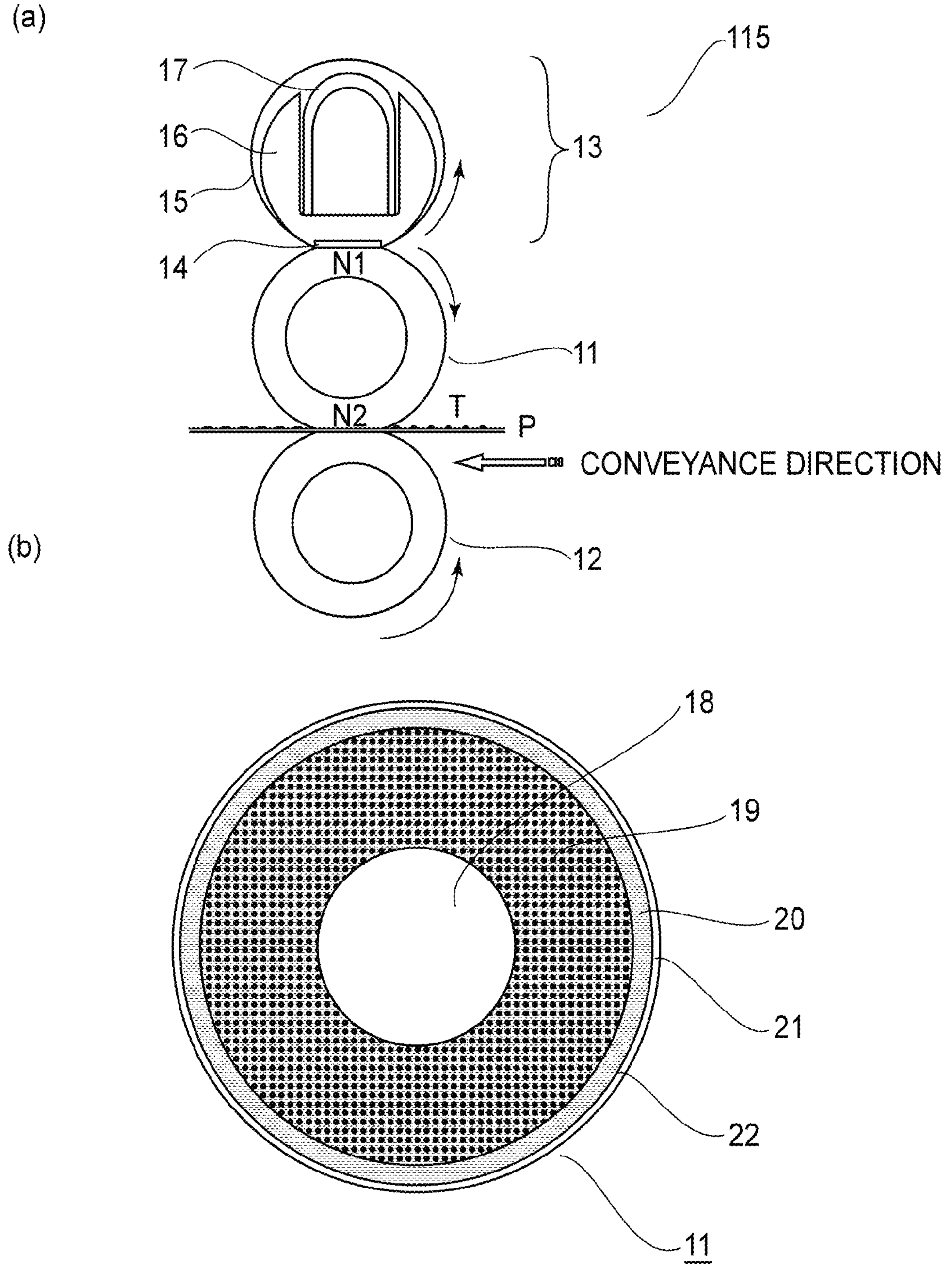
FIG. 7(*a*) is a schematic cross-sectional structural view of a fixing device in Embodiment 2, and FIG. 7(*b*) is a schematic sectional view of a fixing roller which is a rotatable fixing member in Embodiment 2.

FIG. 7(*a*) is a schematic cross-sectional view of a principal part of a fixing device 115 in Embodiment 2. This fixing device 115 is of a so-called surface-heating-type fixing device and as the fixing roller for the fixing device of this type, the rotatable fixing member according to the present invention can be used. Referring to FIG. 7(*a*), a fixing roller 11 is the rotatable fixing member according to the present invention. An elastic pressing roller 12 is disposed below and in parallel to the fixing roller 11 and is pressed against the fixing roller 11 with a predetermined urging force by an unshown urging member. As a result, a fixing nip N2 with a predetermined width is created between the fixing roller 11 and the pressing roller 12. A heating unit 13 for externally heating the fixing roller 11 is disposed above and in parallel to the fixing roller 11. The heating unit 13 performs the function of applying heat from a ceramic heater 14 to the fixing roller 11 through an endless film 15 in a heating nip N1. The ceramic heater 14 is supported by a heater holder 16 and applies an urging force of about 3 kgf to about 25 kgf in total pressure to the heater holder 16 through a U-like metal plate 17 by an unshown spring. As a result, the heating unit 13 is pressed against the fixing roller 11 to create the heating nip N1 with a predetermined width. Further, on a surface of the ceramic heater 14 opposite from the surface constituting the nip N1, a thermistor (not shown) as a temperature detecting element is disposed in contact with the ceramic heater 14. On the basis of a detected temperature from this thermistor, electric power supply to the ceramic heater 14 is controlled, so that the temperature of the ceramic heater 14 is controlled at a predetermined temperature. As a result, an amount of heat applied to the fixing roller 11 is always controlled.

The fixing roller 11 is rotationally driven in a clockwise direction indicated by an arrow at a predetermined speed by a motor (not shown) controlled by a control-circuit portion (not shown) at least during execution of image formation. The pressing roller 12 is rotated in a counterclockwise direction indicated by an arrow by the rotation of the fixing roller 11. Further, in the heating unit 13, by a frictional force created in the heating nip N1 between the fixing roller 11 and the film 15 by the rotation of the fixing roller 11, a rotational force acts on the film 15. As a result, the film 15 is rotated around the holder 16 in the counterclockwise direction indicated by the arrow at a peripheral speed substantially corresponding to the rotational peripheral speed of the fixing roller 11 while intimately sliding on the surface of the heater 14 in the nip N1 at the inner surface of the film 15. Further, the heater 14 is increased in temperature by being supplied with electric power from a power supply (not shown). The temperature of the heater 14 is detected by the thermistor. Detected temperature information is fed back to the control-circuit portion. The control-circuit portion controls the electric power input from the power supply to the heater 14 so that a detected temperature input from the thermistor 5 is kept at a predetermined target temperature (fixing temperature). By the heat of this heater 14, the surface of the rotating fixing roller 11 is externally heated through the film 15 in the heating nip N1.

In a state in which the fixing roller 11 is rotationally driven and the heater 14 is heated and temperature-controlled at the predetermined fixing temperature, the recording material P carrying thereon an unfixed toner image T is introduced into fixing the nip N2 with a toner-image carrying surface oriented toward the fixing roller 11 side. The recording material P intimately contacts the outer surface of the fixing roller 11 in the fixing nip N2 and is nip-conveyed in the fixing nip N2. As a result, heat of the fixing roller 11 is applied to the recording material P and the pressing force is applied to the recording material P in the nip N2, so that the unfixed toner image T is thermally press-fixed on the surface of the recording material P. The recording material P which has passed through the nip N2 is self-separated from the outer circumferential surface of the fixing roller 11 and is conveyed to the outside of the fixing device 115.

(2) Layer Structure of Fixing Roller 11

FIG. 7(*b*) is a schematic view showing a layer structure of the fixing roller 11. Although a specific constitution will be described below, the elastic layer for the fixing roller 11 consists of two layers which have different functions. That is, on the circumferential surface of a metal core 18 as the base material, a heat-insulating elastic layer 19 as a layer having a heat-insulating function is formed and thereon a heat-accumulation layer 20 as a layer having a heat-accumulation function is formed. The heat-insulating elastic layer 19 has the function of imparting elasticity to the roller 11 and insulates the heat applied to the heat accumulation layer 20 to prevent the heat from escaping toward the metal core 18 side. Further, the heat-accumulation layer 20 is formed of the high heat-conductive silicone rubber and imparts elasticity toward the neighborhood of the outermost surface of the roller 11. At the same time, the heat accumulation layer 20 can accumulate the heat from the heating unit 13 by the high heat-conductive filler in the high heat-conductive silicone rubber and has the function of dissipating the heat onto the recording material P. On the circumferential surface of the heat accumulation layer 20, a primer layer 22 is formed and a parting layer 21 is formed on the primer layer 22. The parting layer 21 is formed of a fluorocarbon polymer having a good parting property so that the toner T on the recording material P causes offset. The parting layer 21 may preferably have a thickness as small as possible in order to facilitate heat conduction from the heating unit 13 to the heat-accumulation layer 20 and conduction of heat accumulated in the heat-accumulation layer 20 to the recording material P and the toner T on the recording material P, thus being desirably 25 μm or less as a total thickness of the primer layer 22 and the parting layer 21.

That is, the fixing roller 11 is supplied with heat from the heating unit 13 in the heating nip N1 and accumulates the heat in the heat accumulation layer 20 in the neighborhood of the surface layer. At this time, the heat-insulating elastic layer 19 performs the function of preventing the heat accumulated in the heat accumulation layer 20 from escaping toward the metal core side. Then, the heat accumulated in the heat-accumulation layer 20 is dissipated onto the recording material P and the toner T thereon, which are nip-conveyed in the fixing nip N2 between the fixing roller 11 and the pressing roller 12, so that the toner T can be fixed on the recording material P by heat and pressure. The fixing roller 11 may desirably have a hardness in the range of 35 degrees to 60 degrees as measured by an ASKER-C hardness meter (load: 500 gf) in order to obtain an appropriate nip width, and the elastic layer (consisting of the heat-insulating elastic layer and the heat-accumulation elastic layer) may desirably have a thickness in the range of 1 mm to 5 mm. It is desirable that the pressing roller 12 is pressed against the fixing roller 11 with a total pressure of about 3 kgf to about 25 kgf.

In the fixing device 115 of the external-surface heating type, the total thickness of the rubber layer (the sum of the thicknesses of the heat-insulating elastic layer 19 and the heat-accumulation elastic layer 20) of the fixing roller 11, which is directly contactable to the toner T is selected so that the fixing device 115 has sufficient elasticity and can fix the toner on the recording material while sufficiently covering the toner by following the surface shape of the recording material even when an unevenness due to paper fibers occurs at the surface of the recording material. As a result, it is possible to suppress density non-uniformity due to non-uniformity of a degree of toner deformation and to suppress color mixing non-uniformity of the color toners. This effect of the fixing device 115 is remarkable compared with that of the fixing device 114 in Embodiment 1.

In the fixing device 115 of the type, as the thickness of the parting layer 21 is increased, the supply of the heat from the heating unit 13 to the heat-accumulation elastic layer 20 in the heating nip N1 and the dissipation of the heat from the heat-accumulation elastic layer 20 onto the recording material P are prevented to a greater extent. As a result, the fixability is lowered and therefore it is desired that the parting layer is formed with a small thickness. However, particularly in the case where the thickness of the elastic layer underlying the parting layer 21 is large as in this embodiment, compared with Embodiment 1 (in which the elastic layer is thin), the influence of expansion of the elastic layer during the baking of the parting layer is large. For that reason, it has been further difficult to form the parting layer with no adverse influences, such as the lowering in surface properties, the lowering in durability, and the thermal deterioration of the elastic layer. According to the present invention, to prevent these adverse influences, the parting layer 12 of the fixing roller 11 can be formed with the small thickness.

(3) Constitution of Fixing Roller 11

Next, the constitution of the fixing roller 11 will be described. The constitution of the fixing roller 11 is the same as that in Embodiment 1 except for a part of the base material and the elastic layer.

(3-1) Base Material 18

As the base material 18, e.g., the metal core is formed of metal, such as aluminum, iron, stainless steel or nickel, or alloy of these metals.

(3-2) Elastic Layers 19 and 20

As a material for each of the heat-insulating elastic layer 19 and the heat-accumulation 20, e.g., a heat-resistant rubber such as a silicone rubber or a fluorocarbon rubber is used. Particularly, similarly as in Embodiment 1, of the silicone rubber, an addition-curing silicone rubber is frequently used from the viewpoint of a processing property. As the addition-curing silicone rubber for the elastic layer 19 used as the heat insulating layer, a solid rubber may be used as it is. In order to positively impart the heat-insulating property to the elastic layer 19, a heat-insulating filler may be mixed, or a rubber such as organic foam rubber, millable rubber, water-expanded foam rubber, which is excellent in heat insulating property and has the thermal conductivity in the range of 0.23 W/m·k to 0.1 W/m·k, may be used. The elastic layer 19 may desirably have a thickness of 1 mm or more and 5 mm or less in order to impart the elasticity for creating the fixing nip N2. In the conventional fixing device, the elastic layer having such a thickness is largely expanded when the coating-parting layer is formed thereon (particularly during the baking of the coating), thus being remarkably disadvantageous in terms of formation of the coating-parting layer. However, according to the present invention, a good parting layer can be formed. Further, the rubber hardness may preferably be in the range from 0 degrees to 45 degrees in terms of JIS-A hardness. Further, with respect to the elastic layer 20 used as the heat-accumulation layer, similarly as in the case of the elastic layer in Embodiment 1, the silicone rubber, in which the high heat-conductive filler is dispersed, is used. As the high heat-conductive filler, it is possible to use alumina, aluminum nitride, boron nitride, carbon, carbon nanofiber, metal silicon, zinc oxide, silicon oxide, etc. These materials can be used singly or in mixture of two or more species. In order to obtain a sufficient heat-accumulating property, particularly, a high heat-conductive silicone rubber having the thermal conductivity of 0.7 W/m·k or more and 2.0 W/m·k or less may desirably be used.

Further, with respect to the thickness of the heat-accumulation elastic layer 20, a heat-accumulation function is impaired when the thickness is excessively small, and it is difficult to dissipate the accumulated heat when the thickness is excessively large. Therefore, the heat-accumulation layer 20 may desirably be formed in the thickness in the range of 0.05 mm to 1.0 mm, more desirably 0.08 mm to 0.2 mm.

(3-3) Primer Layer 22

Between the heat accumulation elastic layer 20 and the parting layer 21, the primer layer 22 for bonding the elastic layer 20 of the silicone rubber and the parting layer of the fluorocarbon polymer is provided. The material for the primer layer 22 is the same as that in Embodiment 1 and thus a specific description will be omitted, but is a thermally melted product of a fluorocarbon polymer containing a crystalline fluorocarbon polymer having a functional group. An aqueous dispersion, in which fine particles of a mixture of the crystalline fluorocarbon polymer containing the functional group and a crystalline fluorocarbon polymer containing no functional group are dispersed in an aqueous solvent (water), is used. Incidentally, the primary particle size of the fine particles is also the same as that in Embodiment 1, i.e., is required to be 830 nm or less, preferably 360 nm or less. Further, the thickness of the primer layer 22 is also the same as that in Embodiment 1, i.e., is required to be 830 nm or less, preferably 360 nm or less in order to provide the parting layer 21 with good surface properties.

(3-4) Parting Layer 21

The fluorocarbon polymer for the parting layer 21 used in this embodiment is the same as that in Embodiment 1. Therefore, details thereof will be omitted but a fluorocarbon polymer mixture containing the crystalline fluorocarbon polymer which is insoluble in a solvent is used. For that reason, the fluorocarbon polymer is used in the form of a dispersion of fluorocarbon polymer fine particles (primary particle size: 830 μm or less, preferably 360 nm or less) in the solvent such as water.

(4) Manufacturing Method of Fixing Roller 11

(4-1) Formation of Elastic Layers 19 and 20

On the base material 18, which has been treated with a primer in advance, the elastic layers 19 and 20 are formed. The elastic layers 19 and 20 may be formed by a known method, such as a method in which the material such as a liquid silicone rubber or the like is coated on the base material 18 in a uniform thickness by a means such as blade coating and then is heat-cured. It is also possible to form the elastic layers 19 and 20 by a method in which the material such as the liquid silicone rubber is injected into a mold and then is heat-cured, a method of heat-curing the material after extrusion molding, a method of heat-curing after ejection molding, and the like. In the case where an addition-curing liquid silicone rubber, which exhibits a particularly good heat insulating property and contains microballoons, is used as the material for the elastic layer 19 as the heat insulating layer, the silicone rubber may desirably be molded by using a mold so that a skin layer can be formed. By the microballoons, many pores are formed in the thick elastic layer 19, so that the elastic layer 20 to be formed on the elastic layer 19 is roughened when the skin layer is not present. The elastic layer 20 as the heat-accumulation layer is formed by coating on the elastic layer 19 the addition-curing liquid silicone rubber mixture, in which alumina particles are mixed as the high heat conductive filler, by using the ring coating in the same manner as that in the case of the elastic layer 2B in Embodiment 1. Then, the coated silicone-rubber mixture can be heat-cured by the primary vulcanization and then by the secondary vulcanization to form the elastic layer 20.

(4-2) Pre-Process of Primer Layer Formation on Elastic Layer Surface

The surface of the elastic layer 20 which has been formed by completing the secondary vulcanization may desirably be subjected to hydrophilizing treatment through UV treatment (UV irradiation treatment) on the like before the primer layer 22 is formed similarly as in Embodiment 1.

(4-3) Formation of Primer Layer 22

In order to obtain good surface smoothness of the parting layer also in this embodiment, the primer layer 22 is formed on the heat-accumulation elastic layer 20 similarly as in Embodiment 1. That is, the primer layer 22 is required to be formed with a thickness of 830 nm or less, and preferably 360 nm or less so as to cover the entire area of the elastic layer 20. For that purpose, the method of forming the primer layer 22 on the elastic layer 20 may desirably include at least three steps (first to third steps) described below. The first step is a step of applying the dispersion of the primer so as to cover the entire area of the elastic layer. Then, in the second step, the coating layer of the primer layer is dried to obtain a dried primer layer. Then, in the third step, a part of the dried primer layer is removed to decrease and uniformize the layer thickness to 850 nm or less.

(4-4) Formation of Parting Layer 21

The fluorocarbon polymer primer and the fluorocarbon polymer for the parting layer 21 which are used in the present invention are insoluble in the solvent similarly as in Embodiment 1. For that reason, the fluorocarbon polymer primer is used in the form of a dispersion of fluorocarbon polymer primer fine particles (primary particle size: 850 μm or less) in the solvent such as water. Incidentally, herein, the value of the primary-particle size refers to a measured value by the SEM. In the constitution of this embodiment, the thickness of the elastic layer may desirably be 1 mm or more and 5 mm or less, which is larger than that of the elastic layer in the constitution of Embodiment 1 by several times to several tens of times, so that an amount of thermal expansion is also large. In this case, when the primer layer 22 is formed with a large thickness, large cracks are liable to occur during the baking. However, in this embodiment, the thickness itself of the primer layer 22 is 850 nm or less, so that the resultant surface unevenness is also not more than 850 nm. For this reason, the primer layer 22, which is very smooth and is free from a crack, can be formed. For that reason, the parting layer 21 to be formed on the primer layer 2D can be formed very smoothly at its surface already in a state before the baking. Also during baking, the underlying primer layer 2D is a very thin layer. For that reason, there is no influence of the occurrence of a crack and it is possible to form a very smooth film without largely disturbing the surface smoothness.

(5) Advantages of Present Invention

For this reason, in the present invention, even in the case where the thermal expansion of the roller outer shape is large during the baking of the parting layer, it is possible to form the film having very good surface properties. Particularly, even in the case where the elastic layer has a large thickness and a large thermal-expansion amount, specifically in the case where the elastic layer has a thickness of more than 1 mm, the very good parting layer can be formed in the film.

(6) Primer Layer Thickness Measuring Method

The primer layer thickness immediately after the primer layer formation can be measured in the same manner as in Embodiment 1.

(7) Fixing Roller in Embodiment 2

A manufacturing method of the fixing roller 11 shown in FIG. 7(*b*) as the fixing roller in Embodiment 2 will be described based on specific examples.

(7-1) Preparation of Elastic Layer 19 (Heat Insulating Layer) for Fixing Roller 11

As the base material 18, a metal core of aluminum having an outer diameter of 10 mm was used. On the other circumferential surface of the metal core 18, a primer ("DY39-051", mfd. by Dow Corning Toray Co., Ltd.) was uniformly coated in a thin layer and then was baked at 200° C. for 30 min. The thus primer-treated core metal 18 was set in a pipe-like metal mold. Then, into the metal mold, as the silicone rubber for the elastic layer 19, a well-mixed composition (mixture) of the addition-curing silicone rubber containing resinous microballoons with triethylene glycol as an open cell-forming agent was injected and was subjected to the primary vulcanization at 130° C. for 60 min. As a result, a cylindrical elastic layer 19 having a thickness of 3.0 mm, a length of 230 mm, and an outer diameter of 15.9 mm with the skin layer as the outermost surface layer was formed by molding.

(7-2) Preparation of Elastic Layer 20 (Heat Accumulation Layer) for Fixing Roller 11

On the above-formed elastic layer 19, similarly as in Embodiment 1, the elastic layer 20 of the high heat-conductive filler-containing silicone rubber by the ring coating method. As the high heat-conductive filler-containing silicone rubber, an addition-curing silicone rubber ("SE4400", mfd. by Dow Corning Toray Co., Ltd.), which contained an alumina filler, was used. This silicone rubber was coated on the elastic layer 19 with a thickness of 100 μm by the ring-coating method (FIG. 2(*b*)) and was subjected to the primary vulcanization at 130° C. for 5 minutes by the infrared heater. Therefore, the high heat-conductive filler-containing silicone rubber is cured by being heated for 4 hours in the electric oven set at 200° C. to form the elastic layer 20.

(7-3) Formation of Primer Layer 22 for Fixing Roller 11

Next, the surface of the elastic layer 20 was subjected to UV treatment (UV irradiation). Then, on the surface of the elastic layer 20, a fluorocarbon polymer primer, which was the same aqueous dispersion as that in Embodiment 1, was spray-coated. That is, this step is a first step of forming a dispersion application layer by applying the dispersion of the fluorocarbon polymer mixture onto the elastic layer 20. Then, the application layer was dried by hot air with a drier to form an about 4 to 6 μm-thick dried primer layer in which mud cracks were generated. That is, this step is a second step of forming a dried primer layer by drying the dispersion application layer. Next, the non-woven fabric ("BEMCOT") was pressed against the primer layer surface while rotating the roller on which the dried primer layer obtained in the second step, so that a part of the dried primer layer was removed. That is, this step is a third step of decreasing the thickness of the dried primer layer by removing a part of the dried primer layer.

The primer is constituted by spherical fixing-device fine particles having a primary-particle size of about 150 nm, so that the primer fine particles are liable to pass through a gap between the pressed non-woven fabric and the surface of the elastic layer 20. Further, the primer fine particles present at an interface of the silicone rubber are physically and chemically adsorbed strongly by the silicone rubber surface, so that the primer fine particles are not readily scraped off and therefore are little removed by a manner of rubbing the primer fine particles with the non-woven fabric while pressing the non-woven fabric against the primer fine particles. By changing the thickness of the dried primer layer and the degree of the pressing with the non-woven fabric, most of the primer layer can be uniformly scraped off to adjust the layer thickness, so that primer layers having thicknesses of 150 nm, 450 nm and 800 nm were formed.

(7-4) Formation of Parting Layer for Fixing Roller 11

As the material for the parting layer, a dispersion of PFA fine particles having the melting point of 310° C. and the particle size of 200-300 nm was used. This dispersion was coated on the roller surface by spray coating. The parting layer was formed so that the total thickness including the primer layer thickness was 8 μm and 15 μm. At this time, the dispersion was set-coated by the spray coating so as to be leveled on the roller surface. Then, the roller coated with the parting layer was placed and dried for 10 minutes in the electric oven set at 90° C. and then baked for 7 minutes in the electric oven set at 360° C. Then the roller was taken out and then was air-cooled.

In the above-described manner, six fixing rollers in Examples 1 to 6 of Embodiment 2 in which the primer layer thickness was 150 nm, 450 nm or 800 nm and the total thickness including the primer layer thickness was 8 μm or 15 μm were prepared. Specifically, the fixing roller in Example 1 had the primer layer thickness of 800 nm and the total thickness of 15 μm, the fixing roller in Example 2 had the primer layer thickness of 450 nm and the total thickness of 15 μm, the fixing roller in Example 3 had the primer layer thickness of 150 nm and the total thickness of 15 μm, the fixing roller in Example 4 had the primer layer thickness of 800 nm and the total thickness of 8 μm, the fixing roller in Example 5 had the primer layer thickness of 450 nm and the total thickness of 8 μm, and the fixing roller in Example 6 had the primer layer thickness of 150 nm and the total thickness of 8 μm. In this embodiment, the heat-accumulation elastic layer 20 was formed by the ring-coating method, but may also be formed by a method in which a silicone rubber which has been molded in advance by, e.g., an extruding machine is coated on the base elastic layer 19 or by a beam-coating method. Further, the fluorocarbon polymer primer dispersion is coated on the elastic layer 20 by the spray-coating method but may also be coated by a dipping method or the like.

Further, the fluorocarbon polymer dispersion for the parting layer 21 is coated by the spray-coating method but may also be coated by the dipping method.

(8) Comparative Embodiments

In order to substantiate the effect in Embodiment 2 of the present invention, comparative embodiments in which the primer layer application manner and the form of the layer and the baking method are changed are shown below.

(8-1) Comparative Embodiment 1 and Comparative Embodiment 2

The manufacturing method of fixing rollers of Comparative Embodiment 1 and Comparative Embodiment 2 are identical to that in Embodiment 2 except for a method of formation of the primer layer. First, until the UV treatment, the same process as in the case of the fixing roller in Embodiment 2 was performed. The primer layer was coated by the dry coating described above. That is, when the primer is coated by the spray, an end opening of a spray gun was narrowed by adjusting the spraying pressure and the needle position. As a result, the size of the spray coating particles was decreased. Further, a deposition amount on the roller surface per ½ of the reciprocation was decreased so that the spray-coating particles were not leveled with each other and were fixed on the roller-layer surface in a coating-grain state when the spray-coating particles were deposited on the roller surface. As a result, the primer layer was formed with a thickness of about 5 μm in a state in which the primer coating grains were stacked as shown in FIG. 3(*b*). The primer layer was not subjected to the removal step, and then the parting layer was formed in the same manner as in the case of the fixing roller 11 in Embodiment 2 so that the total thickness of the parting layer (including the primer layer thickness) was 15 μm and 8 μm. Further, the baking of the parting layer was also performed in the same manner as in Embodiment 2 to obtain a fixing roller of Comparative Embodiment 1 and a fixing roller of Comparative Embodiment 2.

(8-2) Comparative Embodiment 3 and Comparative Embodiment 4

The manufacturing method of fixing rollers of Comparative Embodiment 3 and Comparative Embodiment 4 are identical to that in Comparative Embodiment 1 and Comparative Embodiment 2 except for the primer layer thickness. The primer layer was formed by the dry coating, so that the primer-layer thickness was 3 μm. The primer layer was not subjected to the removal step, and then the parting layer was coated so that the total thickness of the parting layer (including the primer layer thickness) was 15 μm and 8 μm. The baking of the parting layer was performed in the same manner as in Comparative Embodiments 1 and 2 to obtain a fixing roller of Comparative Embodiment 3 and a fixing roller of Comparative Embodiment 4.

(8-3) Comparative Embodiment 5 and Comparative Embodiment 6

The manufacturing methods of fixing rollers of Comparative Embodiment 5 and Comparative Embodiment 6 are identical to that in Comparative Embodiment 1 and Comparative Embodiment 2 except for the primer-layer thickness and the primer-layer forming method. The primer layer was formed by the wet coating. That is, when the primer is coated by the spray, an end opening of a spray gun was increased by adjusting the spraying pressure and the needle position. As a result, the size of the spray-coating particles was increased. Further, a deposition amount on the roller surface per ½ of the reciprocation was increased so that the spray-coating particles were leveled with each other. As a result, the primer layer was formed in a thickness of about 3 μm. The primer layer was subjected to the removal step in the same manner as in Embodiment 2 and the pressure of the pressing member was adjusted to decrease the thickness to 1 μm. The primer layer was not subjected to the removal step, and then the parting layer was coated so that the total thickness of the parting layer (including the primer layer thickness) was 15 μm and 8 μm. The baking of the parting layer was performed in the same manner as in Comparative Embodiments 1 and 2 to obtain a fixing roller of Comparative Embodiment 5 and a fixing roller of Comparative Embodiment 6.

(8-4) Comparative Embodiment 7 and Comparative Embodiment 8

The manufacturing methods of fixing rollers of Comparative Embodiment 7 and Comparative Embodiment 8 are identical to that in Comparative Embodiment 1 and Comparative Embodiment 2 except for the primer-layer thickness and the primer-layer forming method. The primer layer was formed by the wet coating. That is, when the primer is coated by the spray, an end opening of a spray gun was increased by adjusting the spraying pressure and the needle position to increase the size of the spray-coating particles. Further, a deposition amount on the roller surface per ½ of the reciprocation was increased so that the spray-coating particles were coated and leveled with each other when the spray-coating particles were deposited on the roller surface. As a result, the primer layer was formed with a thickness of about 5 μm, but mud cracks occurred in the primer layer as schematically illustrated in FIG. 4(*a*). The primer layer was not subjected to the removal step, and then the parting layer was formed in the same manner as in Embodiment 2 so that the total thickness of the parting layer (including the primer layer thickness) was 15 μm and 8 μm. Further, the baking of the parting layer was also performed in the same manner as in Embodiment 2 to obtain a fixing roller of Comparative Embodiment 7 and a fixing roller of Comparative Embodiment 8.

(8-5) Comparative Embodiment 9

The manufacturing method of fixing roller 9 of Comparative Embodiment 9 is identical to that in Comparative Embodiment 1, except for the baking method. The primer-layer was formed by the dry coating, so that the primer layer thickness was 3 μm. The primer layer was not subjected to the removal step, and then the parting layer was coated so that the total thickness of the parting layer (including the primer layer thickness) was 15 μm. The baking of the parting layer was performed by placing the roller in the electric furnace and by being dried at 90° C. for 10 min., pre-heated at 220° C. for 30 min., and baked at 360° C. for 8 min. Then, the roller was taken out from the electric furnace and was air-dried to obtain a fixing roller of Comparative Embodiment 9.

(8-6) Comparative Embodiment 10

The manufacturing method of fixing roller 9 of Comparative Embodiment 10 is identical to that in Comparative Embodiment 1 except for the baking method. The primer layer was formed by the dry coating, so that the primer layer thickness was 3 μm. The primer layer was not subjected to the removal step, and then the parting layer was coated so that the total thickness of the parting layer (including the primer layer thickness) was 15 μm. The baking of the parting layer was performed by placing the roller in the electric furnace and by being dried at 90° C. for 10 min., pre-heated at 220° C. for 30 min., and baked at 380° C. for 8 min. Then, the roller was taken out from the electric furnace and was air-dried to obtain a fixing roller of Comparative Embodiment 10.

(9) Performance Comparison Between Examples 1-6 in Embodiment 2 and Comparative Embodiments 1-10

With respect to the above-prepared fixing rollers of Examples 1 to 6 in Embodiment 2 and fixing rollers of Comparative Embodiments 1 to 10, surface properties (surface unevenness, gloss feeling, thermal deterioration of rubber) and an image gloss value (glossiness) when each of the fixing rollers was incorporated in the fixing device and a color image on the recording material was heat-fixed were compared. The results are shown in Table 2.

TABLE 2

| EMB. NO. | TYPE OF PFA IN PARTING LAYER | PRIMER LAYER THICKNESS | TOTAL THICKNESS | BAKING CONDITION (° C./MIN.) | SURFACE STATE*1 | GLOSS FEELING | IMAGE GLOSS VALUE | RUBBER BLISTER*2 |
|---|---|---|---|---|---|---|---|---|
| EMB. 2 EX. 1 | HMP*3 | 800 nm | 15 μm | 360/7 | A | A | 70 | A |
| EMB. 2 EX. 2 | HMP | 450 nm | 15 μm | 360/7 | A | A | 71 | A |
| EMB. 2 EX. 3 | HMP | 150 nm | 15 μm | 360/7 | A | A | 77 | A |
| EMB. 2 EX. 4 | HMP | 800 nm | 8 μm | 360/7 | A | A | 70 | A |
| EMB. 2 EX. 5 | HMP | 450 nm | 8 μm | 360/7 | A | A | 71 | A |
| EMB. 2 EX. 6 | HMP | 150 nm | 8 μm | 360/7 | A | A | 77 | A |
| COMP. EMB. 1 | HMP | 5 μm | 15 μm | 360/7 | C | C | 56 | A |

TABLE 2-continued

| EMB. NO. | TYPE OF PFA IN PARTING LAYER | PRIMER LAYER THICKNESS | TOTAL THICKNESS | BAKING CONDITION (° C./MIN.) | SURFACE STATE*1 | GLOSS FEELING | IMAGE GLOSS VALUE | RUBBER BLISTER*2 |
|---|---|---|---|---|---|---|---|---|
| COMP. EMB. 2 | HMP | 5 μm | 8 μm | 360/7 | C | C | 44 | A |
| COMP. EMB. 3 | HMP | 3 μm | 15 μm | 360/7 | C | C | 56 | A |
| COMP. EMB. 4 | HMP | 3 μm | 8 μm | 360/7 | C | C | 44 | A |
| COMP. EMB. 5 | HMP | 1 μm | 15 μm | 360/7 | C | C | 58 | A |
| COMP. EMB. 6 | HMP | 1 μm | 8 μm | 360/7 | C | C | 46 | A |
| COMP. EMB. 7 | HMP | 5 μm wet | 15 μm | 360/7 | C | D | 40 | A |
| COMP. EMB. 8 | HMP | 5 μm wet | 8 μm | 360/7 | C | D | 37 | A |
| COMP. EMB. 9 | HMP | 5 μm | 15 μm | 360/8 | B | B | N.M.*4 | B |
| COMP. EMB. 10 | HMP | 5 μm | 15 μm | 360/8 | B | A | N.M.*4 | C |

*1"A" represents good, "B" represents that surface unevenness somewhat occurred, and "C" represents that surface unevenness occurred.
*2"A" represents that abnormal hardness and the rubber blister did not occur, "B" represents that abnormal hardness occurred, and "C" represents that abnormal hardness and the rubber blister occurred.
*3"HMP" represents high melting point.
*4"N.M." represents that the gloss value is not measurable.

Figure 8:
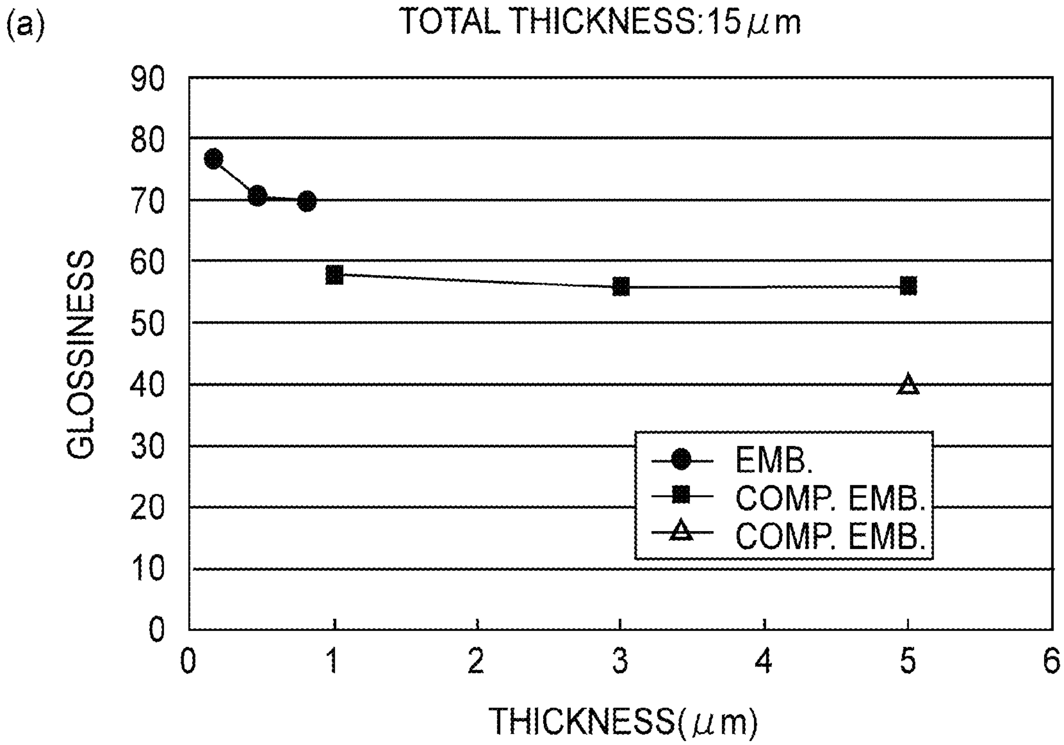
FIG. 8(*a*) is a graph showing the relationship between a primer layer thickness and a gloss value (glossiness) with respect to fixing rollers having a parting layer thickness of 15 μm in Embodiment 2 and Comparative Embodiments, and FIG. 8(*b*) is a graph showing the relationship between the primer layer thickness and the glossiness with respect to fixing rollers having a parting layer thickness of 8 μm in Embodiment 2 and Comparative Embodiments.
Figure 8:
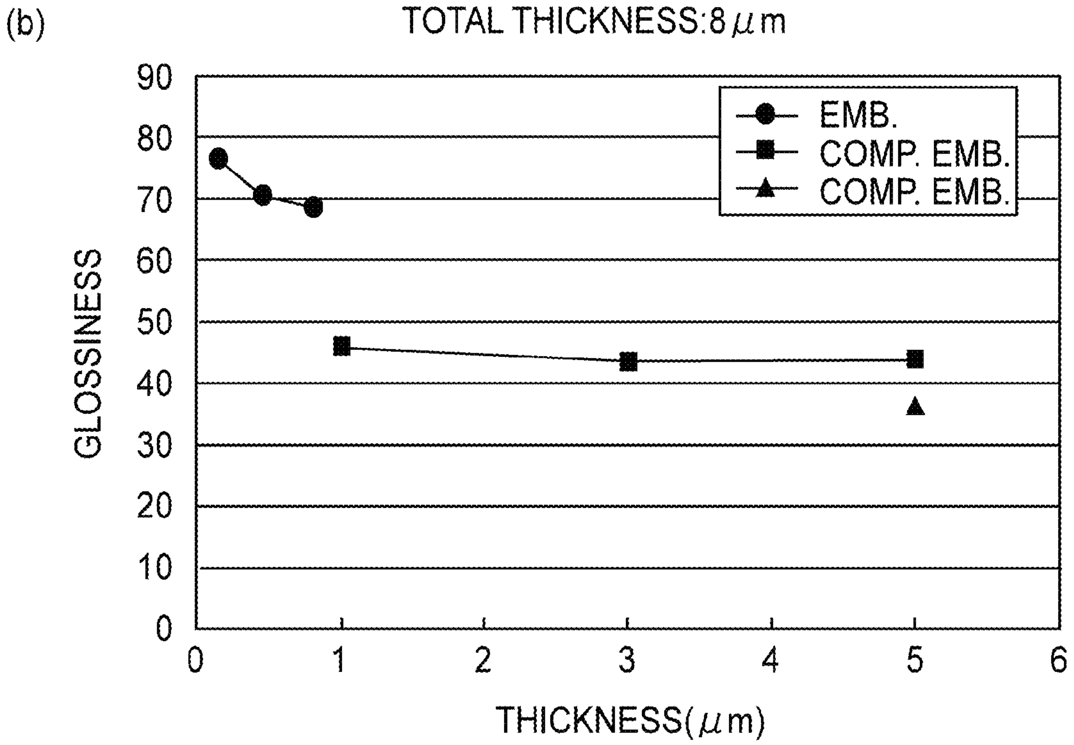

In Table 2, the "surface state" is an observation result when the surface of each of the fixing rollers is observed through an optical microscope with 50-fold magnification. Further, the "gloss feeling" is evaluated relatively in four grades (A: Excellent, B: Good, C: Somewhat poor, D: Poor) when the surface of each of the fixing rollers is observed by eyes. The "Glossiness (image gloss value)" is a measured gloss value by a handy gloss meter ("PG-1" (at 75 deg.), mfd. by Nippon Denshoku Industries Co., Ltd.) when a solid image of secondary color of blue is fixed on letter (LTR) paper. Further, the "rubber blister" is such a phenomenon that the elastic layer silicone rubber is decomposed by high-temperature thermal deterioration during baking to cause local swelling (blister). The gloss values in Table 2 are also shown in FIGS. 8(*a*) and 8(*b*). FIG. 8(*a*) shows the relationship between the primer-layer thickness and the fixing-gloss value in the case where the total thickness of the primer layer and the parting layer is 15 μm. FIG. 8(*b*) shows the relationship between the primer-layer thickness and the fixing-gloss value in the case where the total thickness is 8 μm. As is understood from FIGS. 8(*a*) and 8(*b*), in both cases where the thickness is 15 μm and 8 μm, a better gloss value is obtained when the primer-layer thickness is not more than 850 nm, which is the upper limit of the visible-light wavelength (region) and the gloss value is further improved when the primer-layer thickness is not more than 360 nm, which is the lower limit of the visible-light wavelength (region). On the other hand, when the primer-layer thickness exceeds 1 μm, the gloss value is not good relatively and is substantially constant even when the primer layer thickness is further increased. This is attributable to a phenomenon that cracks are liable to occur in the primer layer as shown in FIGS. 4(*a*) to 4(*c*) with an increasing primer-layer thickness to result in surface unevenness of the parting layer close in thickness to the primer layer thickness. This means that when the unevenness is not more than the visible-light wavelength, diffused reflection of visible light due to the surface unevenness is suppressed and thus, a degree of regular (specular) reflection is increased to improve the gloss value. For that reason, when the primer-layer thickness is not more than the lower limit of the visible-light wavelength, a particularly good gloss value is obtained. Further, when the results in the case where the total thickness of the primer layer and the parting layer 21 is 15 μm are compared with those in the case where the total thickness is 8 μm, substantially the same and good gloss values are obtained in Embodiment 2, but the lower gloss values are obtained in Comparative Embodiments when the total thickness is small. From this result, it is understood that the present invention is particularly effective in the case where the total thickness is small.

Further, with respect to the primer-application (coating) method, when the wet coating and the dry coating are compared, it is understood that the wet coating provides a lower gloss value. Further, as in Comparative Embodiments 9 and 10, when the baking temperature is increased or the baking temperature and the baking time are increased so that the surface unevenness of the parting layer is leveled, the gloss value is improved, but the rubber of the elastic layer causes thermal deterioration (abnormal hardness or blister). For that reason, it is understood that the gloss value is not measurable.

As described above, according to the constitution in Embodiment 2, it is understood that good surface properties and the prevention of the thermal deterioration of the rubber, which have been difficult to be realized by the conventional fixing device, are realized. Incidentally, the relationship between the primer-layer thickness and the fixing-gloss value and the results of the thermal deterioration of the rubber in this embodiment are also true for Embodiment 1 using the fixing film 2 including the elastic layer.

In this embodiment, the fixing roller is used as the rotatable fixing member, but can also be applied to another roller so long as the roller includes the elastic layer and the parting layer formed on the elastic layer. For example, the roller in Embodiment 2 can also be applied as it is to the pressing roller 6 of the fixing device. Further, the pressing roller may have a constitution including only the elastic layer of the roller in Embodiment 1 or a constitution in which the heat-insulating layer and the heat-accumulation layer are omitted, and instead a solid rubber layer is employed. Further, the heating unit 13 of the fixing device in Embodiment 2 includes the film 15 but is not limited thereto so long as the heating unit 13 can apply heat to the fixing-roller surface and the elastic layer 20 as the heat-accumulation layer. Specifically, a radiation heater or an electromagnetic IH (induction heater).

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 231312/2009 filed Oct. 5, 2009, which is hereby incorporated by reference.

What is claimed is:

1. A manufacturing method of a rotatable fixing member including a silicone rubber or fluorocarbon rubber layer, a primer layer, and a parting layer, said manufacturing method comprising:

- a first step of subjecting a surface of the silicone rubber or fluorocarbon rubber layer to UV irradiation treatment;
- a second step of applying a dispersion containing a crystalline fluorocarbon polymer having a functional group onto the surface of the silicone rubber or fluorocarbon rubber layer subjected to the UV irradiation treatment;
- a third step of forming the primer layer by drying the dispersion, wherein a thickness of the primer layer is a first thickness;
- a fourth step of decreasing the thickness of the primer layer to 850 nm or less by removing a part of the primer layer on a surface side of the parting layer, wherein after said fourth step, the thickness of the primer layer is a second thickness which is less than the first thickness, and an area of 70% or more of the surface of the primer layer has the thickness of 850 nm or less; and
- a fifth step of forming the parting layer by coating a crystalline fluorocarbon polymer onto the surface of the primer layer having the second thickness and then by baking the coated crystalline fluorocarbon polymer.

2. A method according to claim 1, wherein in said fourth step, the second thickness of the primer layer is 360 nm or less.

3. A method according to claim 1, wherein the primer layer and the parting layer have a total thickness of 15 μm or less.

4. A method according to claim 1, wherein the rotatable fixing member is an endless film.

5. A method according to claim 1, wherein the rotatable fixing member is a roller.

6. A method according to claim 1, wherein in said fourth step, a method in which the thickness of the primer layer is decreased is either one of a method in which an abutting member abuts against a surface of the primer layer on the surface side of the parting layer to scrape the part of the primer layer, a method in which the part of the primer layer is blown off with high-pressure air or gas, and a method in which the primer layer is washed with a liquid.

7. A method according to claim 1, wherein the functional group is a phosphate group.

8. A manufacturing method of a rotatable fixing member including a silicone rubber or fluorocarbon rubber layer, a primer layer, and a parting layer, said manufacturing method comprising:

- a first step of subjecting a surface of the silicone rubber or fluorocarbon rubber layer to UV irradiation treatment;
- a second step of applying a dispersion containing a crystalline fluorocarbon polymer having a functional group onto the surface of the silicone rubber or fluorocarbon rubber layer subjected to the UV irradiation treatment;
- a third step of forming the primer layer by drying the dispersion, wherein a thickness of the primer layer is a first thickness;
- a fourth step of decreasing the thickness of the primer layer to a particle size of the crystalline fluorocarbon polymer having a functional group by removing a part of the primer layer on a surface side of the parting layer, wherein after said fourth step, the thickness of the primer layer is a second thickness which is less than the first thickness, and an area of 70% or more of the surface of the primer layer has a thickness corresponding to a particle size of the crystalline fluorocarbon polymer having a functional group; and
- a fifth step of forming the parting layer by coating a crystalline fluorocarbon polymer onto the surface of the primer layer having the second thickness and then by baking the coated crystalline fluorocarbon polymer.

9. A method according to claim 8, wherein the primer layer and the parting layer have a total thickness of 15 μm or less.

10. A method according to claim 8, wherein the rotatable fixing member is an endless film.

11. A method according to claim 8, wherein the rotatable fixing member is a roller.

12. A method according to claim 8, wherein in said fourth step, a method in which the thickness of the primer layer is decreased is either one of a method in which an abutting member abuts against a surface of the primer layer on the surface side of the parting layer to scrape the part of the primer layer, a method in which the part of the primer layer is blown off with high-pressure air or gas, and a method in which the primer layer is washed with a liquid.

13. A method according to claim 8, wherein the functional group is a phosphate group.

* * * * *